United States Patent
Seo et al.

(10) Patent No.: US 9,812,104 B2
(45) Date of Patent: Nov. 7, 2017

(54) SOUND PROVIDING METHOD AND ELECTRONIC DEVICE FOR PERFORMING THE SAME

(71) Applicant: Samsung Electronics Co., Ltd., Gyeonggi-do (KR)

(72) Inventors: Eun Jung Seo, Gyeongsangbuk-do (KR); Se Jin Ji, Daegu (KR); Dong Guen Hong, Daegu (KR); Tae Min Cho, Gyeonggi-do (KR); In Su Park, Daegu (KR); Hye In Park, Daegu (KR); Du Yeol Lee, Daegu (KR); Bo Ra Lee, Gyeongsangbuk-do (KR); Eun Yeung Lee, Gyeongsangbuk-do (KR); Cheong Jae Lee, Daegu (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/225,108

(22) Filed: Aug. 1, 2016

(65) Prior Publication Data

US 2017/0047053 A1     Feb. 16, 2017

(30) Foreign Application Priority Data

Aug. 12, 2015   (KR) ........................ 10-2015-0113726

(51) Int. Cl.
    *G01P 3/00*          (2006.01)
    *G10H 1/02*          (2006.01)
                (Continued)

(52) U.S. Cl.
    CPC ........... *G10H 1/0008* (2013.01); *G06F 3/017* (2013.01); *G10H 1/02* (2013.01); *G10H 1/34* (2013.01);
                (Continued)

(58) Field of Classification Search
    CPC .......... G10H 1/0008; G10H 1/02; G10H 1/34; G10H 2220/326; G10H 2220/201; G10H 2220/116; G10H 2210/241; G06F 3/017
                (Continued)

(56) References Cited

U.S. PATENT DOCUMENTS 8,222,507 B1 * 7/2012 Salazar ................ G10H 1/0008
                                                   84/602
8,362,347 B1 * 1/2013 Scharfeld ............. G09B 15/023
                                                    84/470 R (Continued)

FOREIGN PATENT DOCUMENTS

| KR | 10-2012-0005940 A | 1/2012 |
|---|---|---|
| KR | 10-2012-0096880 A | 8/2012 |
| KR | 10-2014-0062895 A | 5/2014 |

*Primary Examiner* — Jeffrey Donels
(74) *Attorney, Agent, or Firm* — Cha—Reiter, LLC.

(57) ABSTRACT

An electronic device is provided. The electronic device includes a display; a memory for storing at least one audio signal; a communication circuit configured to establish wireless communication with an external device; and a processor electrically connected with the display, the memory, and the communication circuit, wherein the memory stores instructions for, when executed, causing the processor to: produce the at least one audio signal, receive data associated with a gesture through the communication circuit from the external device apply a sound effect, selected based at least in part on the data associated with the gesture, to the produced at least one audio source, and output or store a resulting audio signal, wherein the resulting audio signal represents application of the sound effect to the produced at least one audio signal.

14 Claims, 13 Drawing Sheets

(51) Int. Cl.
  *G10H 1/00* (2006.01)
  *G06F 3/01* (2006.01)
  *G10H 1/34* (2006.01)

(52) U.S. Cl.
  CPC . *G10H 2210/241* (2013.01); *G10H 2220/116* (2013.01); *G10H 2220/201* (2013.01); *G10H 2220/326* (2013.01)

(58) Field of Classification Search
  USPC .......................................................... 84/626
  See application file for complete search history.

(56) References Cited

U.S. PATENT DOCUMENTS

| | | | | |
|---|---|---|---|---|
| 8,835,738 B2* | 9/2014 | Little | .................. | G10H 1/38 84/613 |
| 9,239,620 B2 | 1/2016 | Chang | | |
| 9,330,649 B2* | 5/2016 | Buskies | .................. | G10H 7/02 |
| 9,489,125 B2* | 11/2016 | Tu | .................. | G06F 3/04883 |
| 2003/0159567 A1* | 8/2003 | Subotnick | .................. | G06F 3/017 84/626 |
| 2006/0272489 A1* | 12/2006 | Remignanti | .................. | G10H 1/0091 84/723 |
| 2007/0169615 A1* | 7/2007 | Chidlaw | .................. | G10H 1/0091 84/723 |
| 2007/0256546 A1* | 11/2007 | Hikino | .................. | G10H 1/348 84/615 |
| 2010/0288108 A1* | 11/2010 | Jung | .................. | G06F 3/0488 84/610 |
| 2011/0132172 A1* | 6/2011 | Gueneux | .................. | G10G 1/00 84/454 |
| 2011/0252951 A1* | 10/2011 | Leavitt | .................. | G10H 1/40 84/645 |
| 2012/0006181 A1* | 1/2012 | Harada | .................. | G10H 1/0008 84/600 |
| 2012/0024128 A1* | 2/2012 | Takahashi | .................. | G10H 1/0008 84/600 |
| 2012/0174735 A1* | 7/2012 | Little | .................. | G10H 1/0008 84/613 |
| 2013/0032023 A1* | 2/2013 | Pulley | .................. | G10H 1/0066 84/645 |
| 2013/0180385 A1* | 7/2013 | Hamilton | .................. | G10H 1/0016 84/603 |
| 2014/0083279 A1* | 3/2014 | Little | .................. | G10H 1/0008 84/609 |
| 2014/0132410 A1 | 5/2014 | Chang | | |

\* cited by examiner

SOUND PROVIDING METHOD AND ELECTRONIC DEVICE FOR PERFORMING THE SAME

CLAIM OF PRIORITY

This application claims the benefit under 35 U.S.C. §119 (a) of a Korean patent application filed on Aug. 12, 2015 in the Korean Intellectual Property Office and assigned Serial number 10-2015-0113726, the entire disclosure of which is hereby incorporated by reference.

TECHNICAL FIELD

The present disclosure relates to sound providing methods and electronic devices for performing the same.

BACKGROUND

Recently, an electronic device have been implemented in the form of a smartphone. The electronic device may provide a variety of functions based on application programs installed therein.

For example, an application may output audio signals in response to a user operation.

Since smartphones provide limited inputs (e.g., a display of a limited size and the like) the inputs may not correspond very well to the keys and strings of a musical instrument. Also, if the user composes (or mixes) music in real time based on various user operations, it is difficult to edit the music in an effective dynamic way due to the limited input means of the electronic device.

SUMMARY

Aspects of the present disclosure are to address at least the above-mentioned problems and/or disadvantages and to provide at least the advantages described below. Accordingly, an aspect of the present disclosure is to provide a sound providing method based on linkage with an external device and an electronic device for performing the same. In accordance with an aspect of the present disclosure, an electronic device, comprises a display; a memory for storing at least one audio signal; a communication circuit configured to establish wireless communication with an external device; and a processor electrically connected with the display, the memory, and the communication circuit, wherein the memory stores instructions for, when executed, causing the processor to: produce the at least one audio signal, receive data associated with a gesture through the communication circuit from the external device apply a sound effect, selected based at least in part on the data associated with the gesture, to the produced at least one audio source, and output or store a resulting audio signal, wherein the resulting audio signal represents application of the sound effect to the produced at least one audio signal.

In accordance with another aspect of the present disclosure, an electronic device is provided. The electronic device comprises: a display; a memory for storing at least one audio signal; a communication circuit configured to establish wireless communication with an external device; and a processor electrically connected with the display, the memory, and the communication circuit, wherein the memory stores instructions for, when executed, causing the processor to: provide a user interface (UI), including a first region configured to detect a touch or touch gesture and a second region configured to receive an input for selecting at least one sound effect, on the display, produce the at least one audio signal, receive data associated with the touch or touch gesture through the first region, apply a sound effect, selected based at least in part on the data associated with the touch or touch gesture, to the produced at least one audio signal, and output or store a resulting audio signal, wherein the resulting audio signal represents application of the sound effect to the produced at least one audio signal.

In accordance with another aspect of the present disclosure, a sound providing method is provided. A method for providing sound by an electronic device, the method comprising: producing at least one audio signal; receiving data, associated with a gesture of a user from the external device; applying a sound effect selected based on at least in part on the data associated with the gesture, to the produced at least one audio signal; and outputting or storing a resulting audio signal, wherein the resulting audio signal represents application of the sound effect to the produced at least one audio signal.

In accordance with another aspect of the present disclosure, a computer-readable recording medium storing instructions executed by at least one processor is provided. The instructions may be configured to produce at least one audio signal, receive data associated with a gesture from the external device, apply a sound effect, selected based at least in part on the data associated with the gesture, to the at least one audio signal, and output or store a resulting audio signal, wherein the resulting audio signal represents application of the sound effect to the produced at least one audio signal.

In accordance with another aspect of the present disclosure, a method for providing sound by an electronic device includes: producing at least one audio signal; receiving data, associated with a gesture of a user from an external device; applying a sound effect selected based on at least in part on the data associated with the gesture, to the produced at least one audio signal; and outputting or storing a resulting audio signal, wherein the resulting audio signal represents application of the sound effect to the produced at least one audio signal, wherein varying the produced at least one audio signal based at least in part on the data associated with the gesture when the applying of the sound effect or inserting performance audio signal, corresponding at least in part to the data associated with the gesture, into the produced at least one audio signal when the applying of the sound effect. The data associated with the gesture comprises data associated with a gesture simulating operation of a musical instrument, and wherein the applying of the sound effect or a variation of the sound effect comprises: inserting a performance audio signal of the musical instrument, corresponding to the data associated with the gesture simulating operation of the musical instrument into the produced at least one audio signal. The data associated with the gesture comprises data associated with a gesture simulating conducting music, and wherein the applying of the sound effect comprises: varying producing the at least one audio signal based at least in part on the data associated with the gesture simulating conducting music, and wherein the varying producing the at least one audio signal comprises varying at least one of an output speed, a tone, note, dynamics, tempo, and time. The data associated with the gesture comprises data associated with a finger trace gesture, and wherein the applying of the sound effect comprises: applying a sound effect corresponding to the data associated with finger trace, to the produced at least one audio signal. The sound effect comprises at least one of stuttering, scratching, delaying, or low fidelity. The method further includes sending information, including the sound effect, to another electronic In accordance with another aspect of the present disclosure, an electronic device includes: a display; a memory for storing at least one audio signal; a communication circuit configured to establish wireless communication with an external device; and a processor electrically connected with the display, the memory, and the communication circuit, wherein the memory stores instructions for, when executed, causing the processor to: provide a user interface (UI), including a first region configured to detect a touch or touch gesture and a second region configured to receive an input for selecting at least one sound effect, on the display, produce the at least one audio signal, receive data associated with the touch or touch gesture through the first region, apply a sound effect, selected based at least in part on the data associated with the touch or touch gesture, to the produced at least one audio signal, and output or store a resulting audio signal, wherein the resulting audio signal represents application of the sound effect to the produced at least one audio signal. The data associated with the touch or touch gesture comprises at least one of positional data, speed data, or directional data on the first region.

The second region comprises a first button for selecting a first sound effect and a second button for selecting a second sound effect, wherein, if the first button is selected, the instructions, when executed, cause the processor to apply the first sound effect to the produced at least one audio signal based on a first number of data types among the positional data, the speed data, or the directional data, and wherein, if the second button is selected, the instructions, when executed, cause the processor to apply the second sound effect to the produced at least one audio signal based on a second number of data types, wherein the second number of data types is different from the first number of data types, among the positional data, the speed data, or the directional data. The first region has a quadrangle shape, and wherein the second region comprises a first sub-region adjacent to a vertical periphery of the first region and a second sub-region adjacent to a horizontal periphery of the first region. The first sub-region comprises a first plurality of buttons for selecting a first plurality of sound effects, wherein the second sub-region comprises a second plurality of buttons for selecting a second plurality of sound effects, wherein the first plurality of buttons comprise a stuttering button, a scratching button, a low-fidelity button, or a delaying button, and wherein the second plurality of buttons comprise buttons for selecting a plurality of filtering effect. The processor is further configured to receive a first input, for selecting at least one of the first plurality of sound effects, from the first sub-region, receive a second input, for selecting at least one of the second plurality of sound effects, from the second sub-region, and apply a sound effect to the at least one produced sound based on the first input, the second input, and at least part of the data associated with the touch or touch gesture received through the first region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
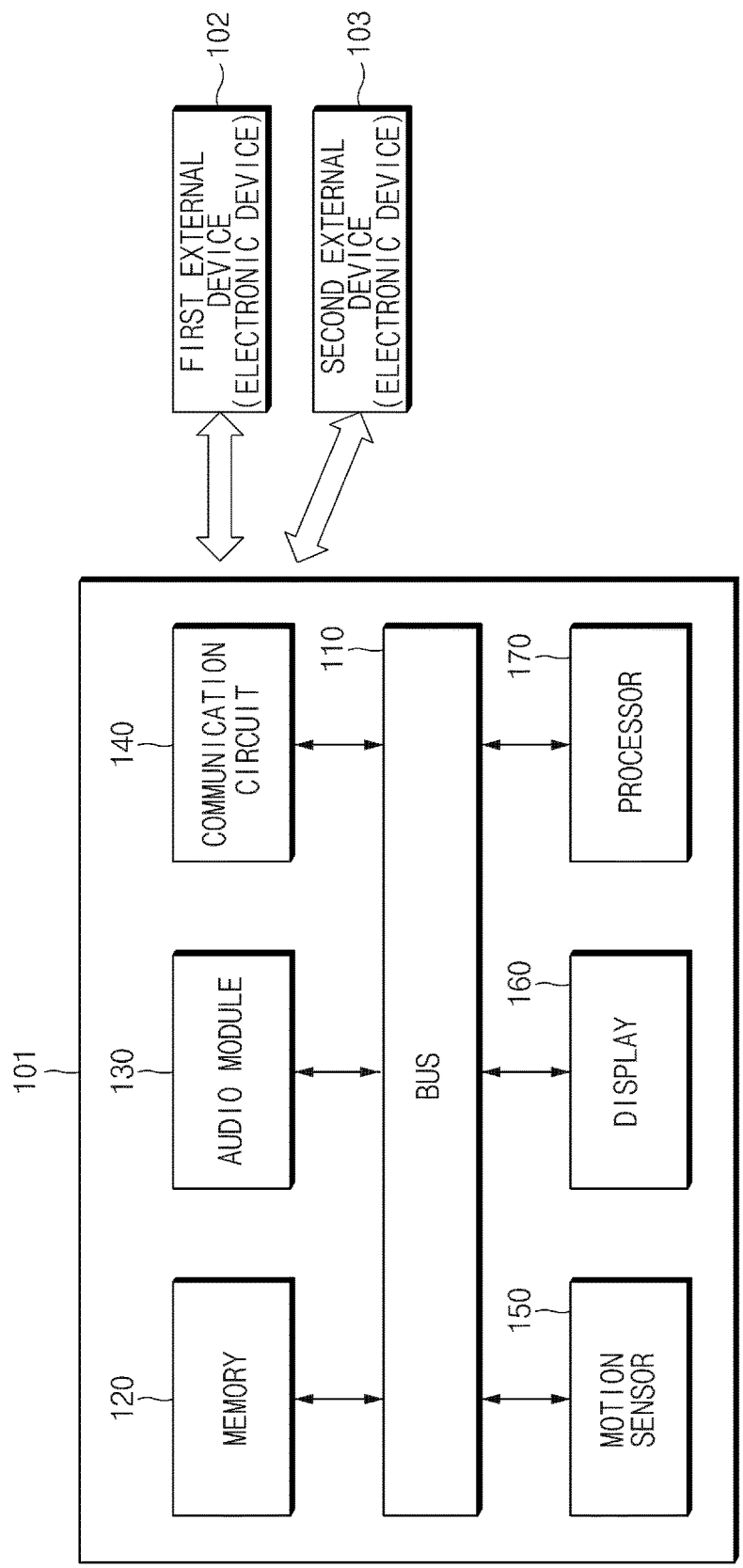
FIG. 1 is a block diagram illustrating a configuration of an electronic device according to an embodiment of the present invention.

Hereinafter, the present disclosure is described with reference to the accompanying drawings. However, the present disclosure is not intended to be limited to the specific embodiments, and it is understood that it should include all modifications and/or, equivalents and substitutes within the scope and technical range of the present disclosure. With respect to the descriptions of the drawings, like reference numerals refer to like elements.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The expressions such as "1st", "2nd", "first", or "second", and the like used in various embodiments of the present disclosure may refer to various elements irrespective of the order and/or priority of the corresponding elements, but do not limit the corresponding elements. The expressions may be used to distinguish one element from another element. For instance, both "a first user device" and "a second user device" indicate different user devices from each other irrespective of the order and/or priority of the corresponding elements. For example, a first component may be referred to as a second component and vice versa without departing from the scope of the present disclosure.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

Depending on the situation, the expression "configured to" used herein may be used as, for example, the expression "suitable for", "having the capacity to", "designed to", "adapted to", "made to", or "capable of". The term "configured to" must not mean only "specifically designed to" hardwarily. Instead, the expression "a device configured to" may mean that the device is "capable of" operating together with another device or other components. For example, a "processor configured to perform A, B, and C" may mean a generic-purpose processor (e.g., a central processing unit (CPU) or an application processor) which may perform corresponding operations by executing one or more software programs which stores a dedicated processor (e.g., an embedded processor) for performing a corresponding operation.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

Electronic devices according to various embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

In various embodiments, the electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or intern& of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development Hereinafter, electronic devices according to various embodiments will be described with reference to the accompanying drawings. The term "user" used herein may refer to a person who uses an electronic device or may refer to a device (e.g., an artificial electronic device) that uses an electronic device.

In the disclosure used herein, it is described that each of an electronic device and an external device may correspond to any one of a smartphone, a tablet personal computer (PC), and a smart watch. However, embodiments of the present invention are not limited thereto. For example, the electronic device may correspond to any one of the above-mentioned various types of electronic devices.

FIG. 1 is a block diagram illustrating a configuration of an electronic device according to an embodiment of the present invention.

Referring to FIG. 1, an electronic device 101 according to an embodiment of the present invention may include a bus 110, a memory 120, an audio module 130, a communication circuit 140, a motion sensor 150, a display 160, and a processor 170. In various embodiments, at least one of the components of the electronic device 101 may be omitted from the electronic device 101, or another component may be further included in the electronic device 101 (refer to FIGS. 10 and 11).

Also, a first external device 102 and/or a second external device 103 shown in FIG. 1 may include some or all of the components 110 to 170 included in the electronic device 101 or may further include a component other than the components 110 to 170.

The bus 110 may include, for example, a circuit which connects components 120 to 170 with each other and sends a communication message (e.g., a control message and/or data) between the components 120 to 170.

The memory 120 may include, for example, a volatile and/or non-volatile memory. The memory can store audio files. One example of an audio file is a digitized audio signal. Microphones convert audio signals to electronic signals. An analog to digital converter digitizes the electronic signals. The audio file can store the digitized electronic signal according to a format such as the Waveform Audio File Format (commonly known as WAVE or a "WAV file"). Additionally, the Motion Picture Experts Group has developed standards for audio compression, such as MPEG-1 Audio Layer 3 (commonly known as MP3, or an "MP3 file"). It shall be understood that "storing an audio signal" refers to storing a digitized electronic signal representing the audio signal. Additionally, the memory can store a file according to the Musical Instrument Digital Interface (MIDI) (a "MIDI file"). A MIDI file represents player information including command sets for note-ons, note-offs, key velocity, pitch bend, and other methods for controlling an instrument.

The audio module 130 may include, for example, a microphone, a speaker, an audio input/output (I/O) port (e.g., a 3.5 mm port), and the like. The audio module 130 may interchangeably convert a sound into an electric signal. For example, the processor 170 may receive sound, which is a basis for a WAV or MP3 file, through the audio module 130, or may output a loaded or produced sound signal. According to various embodiments, the processor 170 may receive a voice input, received through the microphone, as a user input. Hereinafter, producing an audio signal shall refer to any of loading an audio signal, outputting an audio signal, or using an audio program to produce an audio signal according to an audio file.

The communication circuit 140 may establish wireless communication with each of external devices 102 and 103 using a specified protocol. In certain embodiments, the specified protocol can BlueTooth™. According to an embodiment, the communication circuit 140 may receive data, associated with a gesture of a user who uses either the external device 102 or the external device 103, from each of the external devices 102 and 103. The communication circuit 140 may send the received data to the processor 170. For example, the data associated with the gesture may include sensing data about motion (or movement) of each of the external devices 102 and 103. In other words, the external device 102 may send sensing data about its motion (or movement) to the electronic device 101.

According to an embodiment, the gesture of the user may include motions made by a Disc Jockey (DJ). The DJ motions may include all preset motions to apply a certain sound effect to a produced audio signal. For example, the DJ motions may include a motion of moving each of the external devices 102 and 103 (e.g., part of a body of the user, which wears or grips each of the external devices 102 and 103) back and forth within a specified range (a similar motion to a motion of scratching a turntable, a specified gesture for implementing a certain sound effect, and the like).

Also, according to an embodiment, the gesture of the user may include all conducting motions of a specified performance or a piece of music (e.g., an orchestra performance). For example, the conducting motion may include various motions (e.g., motions about a speed of the performance, atone of the performance, time of the performance, dynamics of the performance, a tempo of the performance, and a start and stop of the performance) about a command about the performance, being sent to at least one player.

Also, according to an embodiment, the gesture of the user may include a playing motion of a specified musical instrument. For example, the playing motion of the specified musical instrument may include various playing motions of a guitar (often referred to as "air guitar" motions), a drum, a violin, a viola, and the like (e.g., a stroke for a guitar performance, fingering of a chord for the guitar performance, and the like). The playing motion of the specified musical instrument is not limited thereto. For example, the playing motion of the specified musical instrument may include playing motions of various musical instruments such as a piano (or an electronic keyboard), a contrabass, and a trumpet.

According to various embodiments, each of the electronic devices 102 and 103 may adjust its internal setting to send data, associated with the gesture of the user, to the electronic device 101 in real time. For example, various sensors (e.g., a motion sensor) embedded in the each of the external devices 102 and 103 may set a polling interval to be shorter (e.g., 10 ms).

The motion sensor 150 may sense a gesture or motion (or movement) of the electronic device 101. The motion sensor 150 may convert a variation of a physical quantity caused by the gesture or motion into sensing data. The sensing data may be provided to, for example, the processor 170. In certain embodiments, the processor 170 can write the sensing data to a MIDI file in the memory 120. The motion sensor 150 may include at least one or more of an acceleration sensor (or accelerometer), a gyro sensor, or an earth magnetic field sensor. For example, the motion sensor 150 may detect various motion parameters such as acceleration, a speed, a rotation angle, a location, and the like of the electronic device 101 in a three-dimensional (3D) space and may sense a gesture (or motion (or movement)) of the electronic device 101.

The display 160 may display, for example, a variety of content (e.g., text, an image, a video, an icon, or a symbol and the like) to the user. In various embodiments, the display 160 may detect a touch or a touch gesture from the user by including a touch panel. The display 160 may provide various user interfaces (UIs), used when a sound providing method according to various embodiments of the present invention is performed, to the user (refer to FIGS. 5A and 5B).

The processor 170 may electrically connect with components (e.g., the memory 120, the audio module 130, the communication circuit 140, the motion sensor 150, the display 160, and the like) included in the electronic device 101 and may control the components, or may execute calculation or data processing about communication.

According to an embodiment, the processor 170 may produce at least one audio signal from an audio file stored in the memory 130. Also, the processor 170 may receive data, associated with a gesture of the user, through the communication circuit 140 from each of the external devices 102 and 103. The processor 170 may apply a sound effect on the audio signal, selected based on at least part of the data associated with the gesture, and a variation of the sound effect to the audio signal. The resulting audio signal based on the audio signal from the audio file and the sound effect or the variation of the sound effect (which will now collectively be referred to as a "sound effect") is applied may be output through, for example, the audio module 130 or may be stored in the memory 120.

According to various embodiments, as an example of applying the sound effect, the processor 170 may apply a variation to an audio signal stored in an audio file, based on at least part on data associated with a gesture of the user. Alternatively, the processor may insert a sound, corresponding to the at least part of the data associated with the gesture, into the produced audio signal stored in the audio file.

In one example, the data about a DJ motion (an example of a user gesture) is included in data associated with a gesture of the user. The data can be received from each of the external devices 102 and 103. The processor 170 may apply a sound effect corresponding to the DJ motion, to a audio signal. For example, the sound effect corresponding to the DJ motion may include at least one of stuttering, scratching, delaying, or low fidelity (lo-fi). The sound effect corresponding to the DJ motion is not limited thereto. For example, the sound effect corresponding to the DJ motion may further include a change of an equalizer (EQ), a change of a reproduction speed, insertion of a previously varied audio signal, and the like.

In another example, data about a conducting motion (an example of a user gesture) of a specified performance or music can be included in the data associated with a gesture. The data is received from the external device 102 or the external device 103. The processor 170 may apply a variation of a sound effect corresponding to the conducting motion to a sound signal. For example, the variation of the sound effect corresponding to the conducting motion may include at least one of speed, note/tone (e.g., C sharp, "C#", D, and the like), time (e.g., four-four time and the like), dynamics (e.g., a crescendo, pianissimo, and the like), or a tempo (e.g., moderato, allegretto, and the like), for producing the at least one audio signal. The variation of the sound effect corresponding to the conducting motion is not limited thereto. For example, the variation of the sound effect corresponding to the conducting motion may further include variations of various sound effects used to conduct a performance.

Also, data about a playing motion (an example of a user gesture) of a specified musical instrument can be included in data associated with a gesture of the user. The data can be received from each of the external devices 102 and 103. The processor 170 may insert a performance sound of the specified musical instrument corresponding to the playing motion into a sound signal.

According to various embodiments, the processor 170 may provide a user interface (UI) on the display 160. The user interface can include a first region configured to detect a touch or a touch gesture and a second region configured to detect an input for selecting at least one sound effect.

According to an embodiment, the processor 170 may apply a sound effect, which is selected based at least in part on the data associated with a touch or touch gesture to a audio signal. Alternatively, according to another embodiment, the processor 170 may apply a sound effect to a audio signal selected based on at least part of data associated with a gesture. The data can be received from each of the external devices 102 and 103. The processor 170 may output or store a sound signal based on a produced audio signal, and the sound effect/variation of the sound effect. The stored audio signal can represented the result of application of the sound effect onto the produced audio signal.

According to an embodiment, the data associated with the touch or touch gesture may be received through the first region. The data associated with the touch or touch gesture may be mapped to the first region. Alternatively, according to another embodiment, the data associated with the gesture may be received from each of the external devices 102 and 103. The data associated with the gesture, received from each of the external devices 102 and 103, may be mapped to the first region.

The data associated with the touch or touch gesture and/or the data associated with the gesture, received from each of the external devices 102 and 103, may include, for example, at least one of position data, speed data, or direction data in the first region of the touch or gesture.

According to an embodiment, the second region may include a first button for selecting a first sound effect and a second button for selecting a second sound effect.

For example, if the first button is selected, the processor 170 may apply the first sound effect to an audio signal based on a first number of data types among speed data or directional data of the gesture mapped to the first region.

Also, for example, if the second button is selected, the processor 170 may apply the second sound effect to an audio signal based on a second number of data types. The second number of data types are different from the first number of data types, among positional data, speed data, or directional data of the gesture mapped to the first region.

Meanwhile, according to various embodiments, the second region may include a first sub-region adjacent to a vertical periphery of the first region and a second sub-region adjacent to a horizontal periphery of the first region.

The first sub-region may include a plurality of first buttons for selecting a plurality of first sound effects. The plurality of first buttons may include, for example, a stuttering button, a scratching button, a low-fidelity (lo-fi) button, a delaying button, or a combination thereof.

The second sub-region may include a plurality of second buttons for selecting a plurality of second sound effects. The plurality of second buttons may include, for example, buttons for selecting a plurality of filtering effects.

The processor 170 may receive a first input, for selecting at least one of the plurality of first sound effects, from the first sub-region and may receive a second input, for selecting at least one of the plurality of second sound effects, from the second sub-region. The processor 170 may apply a sound effect to an audio signal based on the first input, the second input, and the at least part of the data associated with the touch or touch gesture received through the first region. Alternatively, according to another embodiment, the processor 170 may apply a sound effect to an audio signal based on the first input, the second input, and at least part of data associated with a gesture, received from each of the external devices 102 and 103.

According to various embodiments, the processor 170 may be configured to further receive input data. The input data can include a gesture or motion (or movement) of the electronic device 101, sensed by the motion sensor 150, a touch or touch gesture detected by a touch panel (not shown) (included in the display 160), or a voice obtained by a microphone (not shown) of the audio module 130. In other words, the processor 170 of the electronic device 101 may apply a corresponding sound effect to produced audio signal based on data obtained from the electronic device 100 as well as the external devices 102 and 103.

Also, according to various embodiments, the processor 170 may send information including a sound effect applied to a produced audio signal, to another electronic device (e.g., the electronic devices 102 and 103) through the communication circuit 140. The other electronic device may apply a sound effect and the like applied in the electronic device 101 to a produced audio signal on the corresponding other electronic device. Therefore, the sound effect and the like may be shared between the plurality of electronic devices.

Also, according to various embodiments, the processor 170 may change environment settings (or configuration) associated with reproducing an audio signal, based on data associated with a gesture of the user, received from each of the external devices 102 and 103. The changing of the environment settings (or configuration) associated with reproducing the audio signal may include changing an octave or a chord at a time (timing) or a measure when the user input is received. In addition, the environment settings (or configuration) associated with producing the audio signal may include details of various settings (or configuration) which will be preset before a performance.

Figure 2:
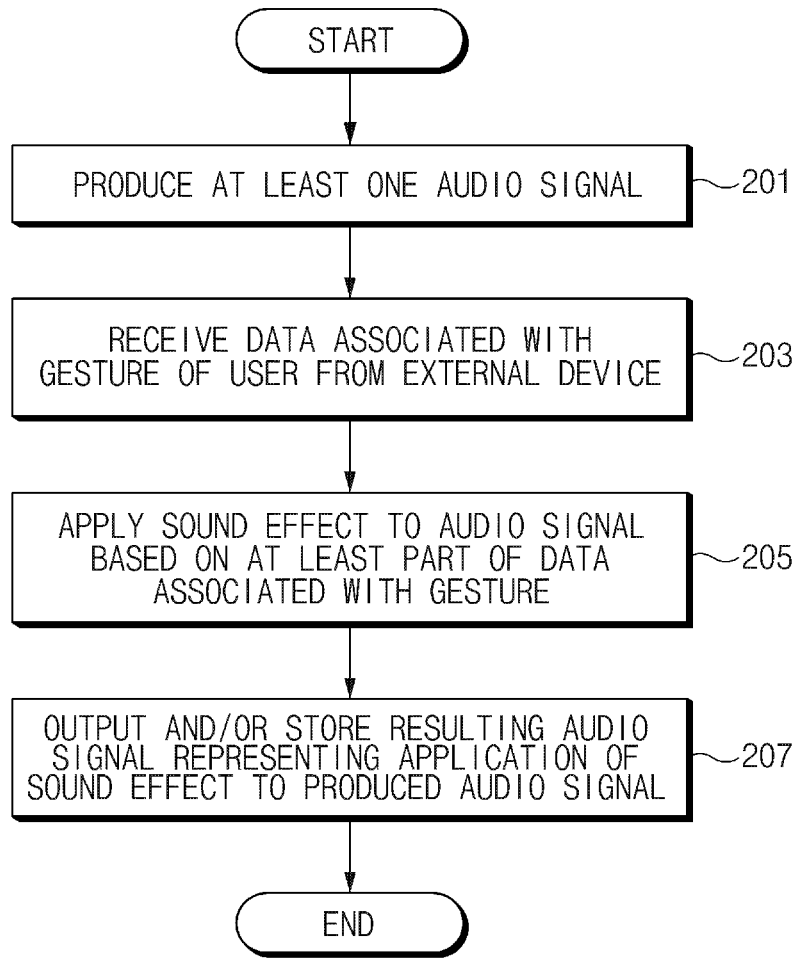
FIG. 2 is a flowchart illustrating a sound providing method according to an embodiment of the present invention.

FIG. 2 is a flowchart illustrating a method for providing an audio signal according to an embodiment of the present invention.

Referring to FIG. 2, the sound providing method according to an embodiment of the present invention may include operations 201 to 207. Each operation of FIG. 2 will be described using reference denotations of FIG. 1.

In operation 201, an electronic device 101 of FIG. 1 may produce at least one audio signal. For example, the audio signal may be produced into a specified application to be output through a speaker and the like included in an audio module 130 of FIG. 1.

In operation 203, the electronic device 101 may receive data associated with a gesture of a user who uses either the external device 102 or the external device 103 shown as FIG. 1, from each of the external devices 102 and 103. The data associated with the gesture of the user may include data about a gesture or motion (or movement) of each of the external devices 102 and 103. For example, the gesture of the user may include a playing motion of a specified musical instrument, conducting motion of music, or DJ motion.

In operation 205, the electronic device 101 may apply a sound effect or a variation of the sound effect, selected based on at least part of data associated with the gesture, to an audio signal. For example, the electronic device 101 may vary a produced audio signal based on the at least part of the data associated with the gesture or may insert a sound, corresponding to the at least part of the data associated with the gesture, into the produced audio signal.

In operation 207, the electronic device 101 may output or store a resulting audio signal. The resulting audio signal represents application of the sound effect on to the produced audio signal during 201. Outputting the at least one audio signal and outputting the resulting audio signal shall be considered to include the circumstance where the at least one audio signal is output and the sound effect is applied to the output audio signal, thereby causing the output to be the resulting audio signal.

In FIG. 2, the process is ended after operation 207. However, embodiments of the present invention are not limited thereto. For example, operations 201 to 207 may be repeatedly performed or may be intermittently performed based on whether data associated with the gesture is received.

According to various embodiments of the present invention, the electronic device 101 may apply various sound effects to a produced audio signal based on various user inputs received from the external devices 102 and 103.

Figure 3:
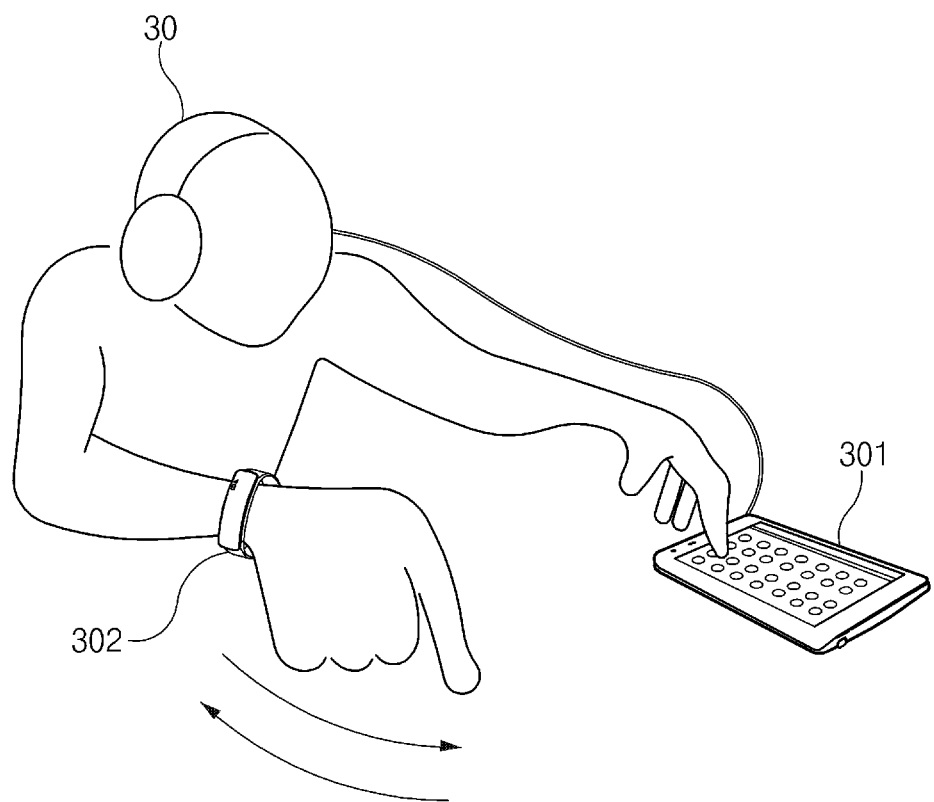
FIG. 3 is a drawing illustrating an environment to which a DJ motion and a sound effect corresponding to the DJ motion are applied, according to an embodiment of the present invention.

FIG. 3 is a drawing illustrating an environment to which a DJ motion and a sound effect corresponding to the DJ motion are applied, according to an embodiment of the present invention.

Referring to FIG. 3, a user 30 may perform a DJ motion using their smartphone 301 and smart watch 302. The smartphone 301 may correspond to an electronic device 101 of FIG. 1, and the smart watch 302 may correspond to a first external device 102 of FIG. 1.

For example, the user 30 may select at least one audio signal with his or her left hand on the smart phone 301. The smartphone 301 may produce the at least one selected audio signal to be output through its audio module (e.g., its audio interface).

Also, the user 30 may perform a DJ motion with his or her right hand. For example, the smart watch 302 worn on a right wrist of the user may move up, down, right, or left in various ways based on the DJ motion. In certain embodiments, the user may move their finger backwards and forwards along a portion of a circular perimeter. A gesture (or motion (or movement)) of the smart watch 302 based on the DJ motion may be sent, as data associated with the DJ motion, to the smartphone 301.

The smartphone 301 may receive the data, associated with the DJ motion, through its embedded communication circuit. The smartphone 301 may apply a sound effect/variation of the sound effect, corresponding to the DJ motion, to a produced audio signal.

Figure 4:
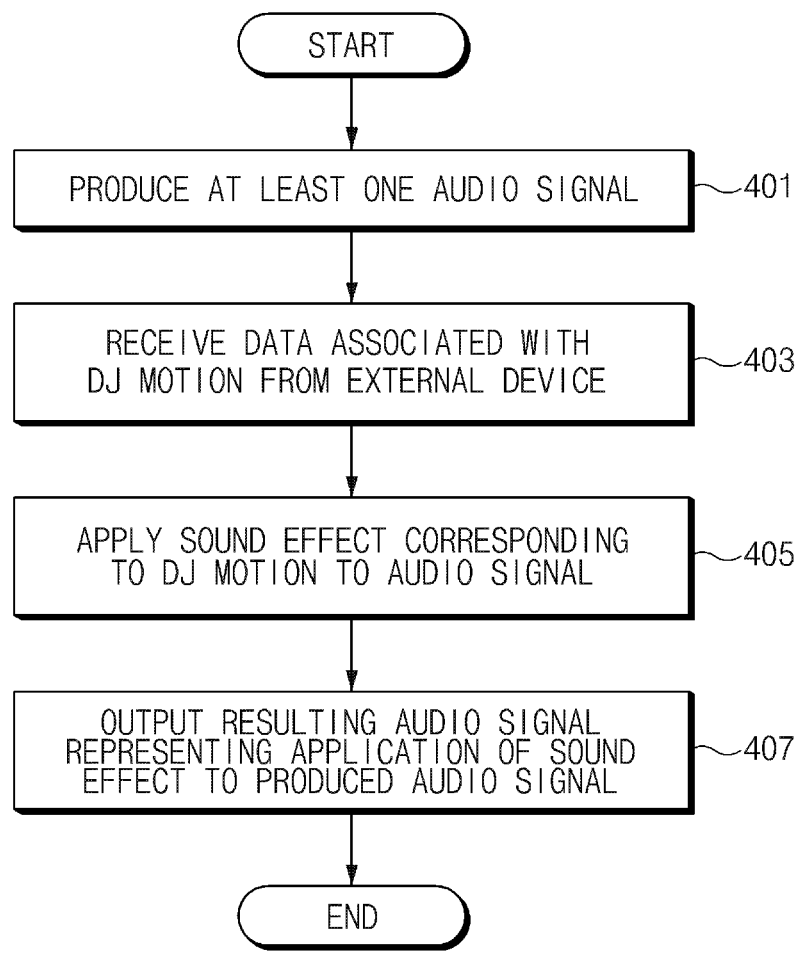
FIG. 4 is a flowchart illustrating a sound providing method based on a DJ motion according to an embodiment of the present invention.
Figure 5A:
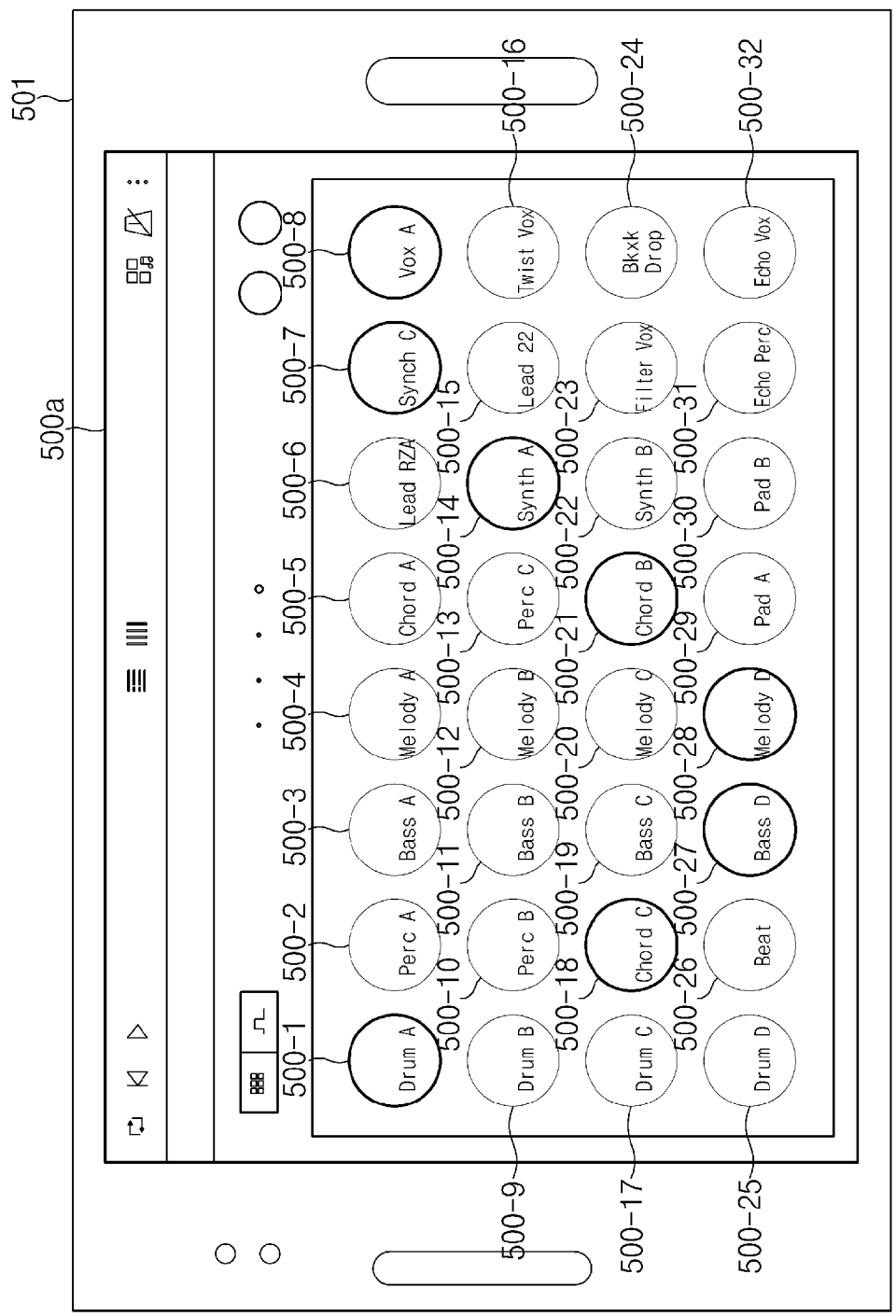
FIG. 5A is a drawing illustrating production of a audio signal according to an embodiment of the present invention.
Figure 5B:
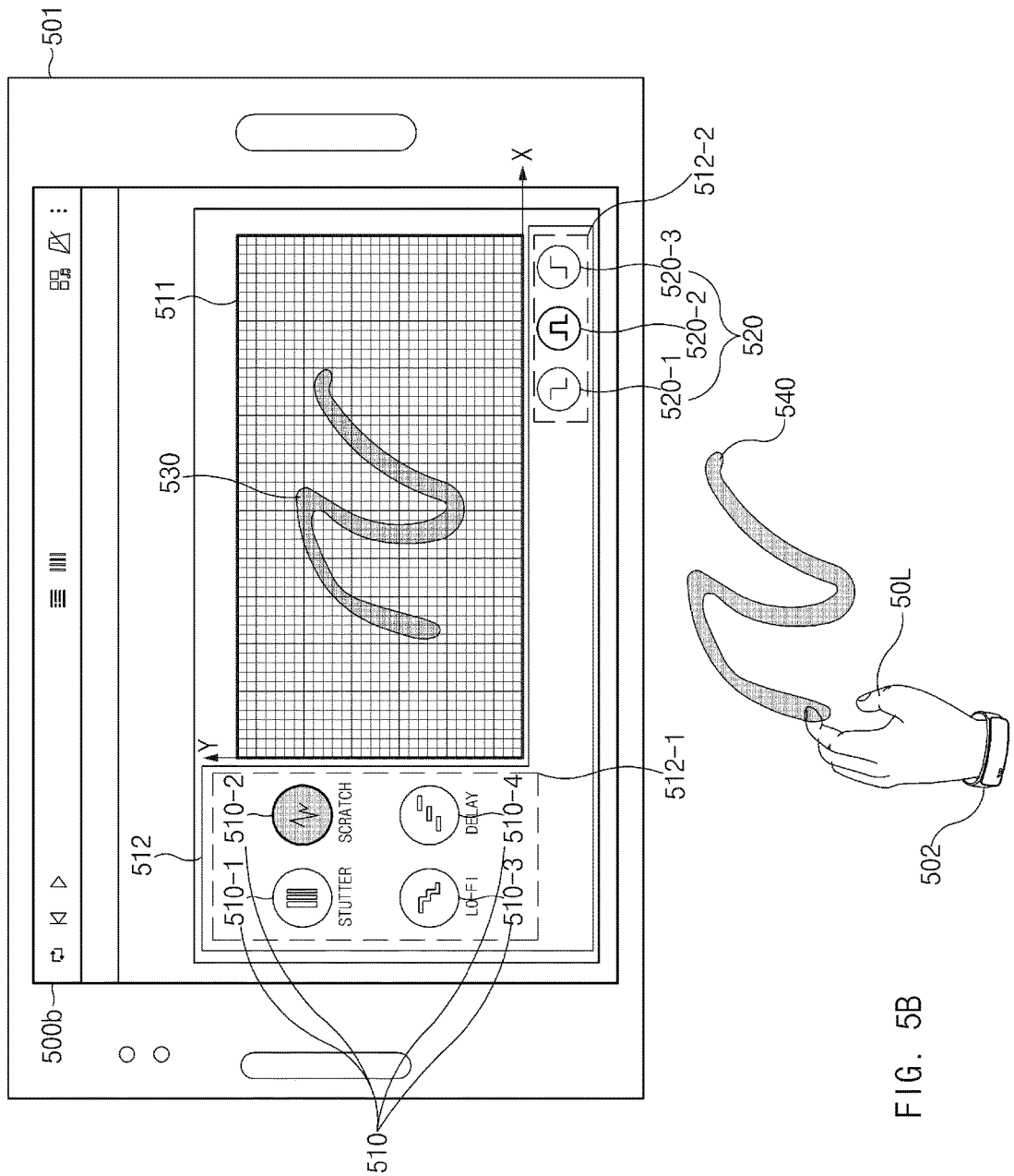
FIG. 5B is a drawing illustrating a sound effect according to an embodiment of the present invention.

FIG. 4 is a flowchart illustrating a method for providing an audio signal based on a DJ motion according to an embodiment of the present invention. FIG. 5A is a drawing illustrating reproduction of an audio signal according to an embodiment of the present invention. FIG. 5B is a drawing illustrating a sound effect according to an embodiment of the present invention.

Referring to FIG. 4, the sound providing method according to an embodiment of the present invention may include operations 401 to 407. For example, operations 401 to 407 may be performed by an electronic device 101 of FIG. 1, a smartphone 301 shown in FIG. 3, or a smartphone 501 shown in FIGS. 5A and 5B. Hereinafter, each of operations 401 to 407 of FIG. 4 will be described using reference denotations of FIG. 3, and, if necessary, will be described with reference to FIG. 3 together with FIGS. 5A and 5B.

In operation 401, a smartphone 301 of FIG. 3 may produce at least one audio signal. For example, the at least one audio signal may correspond to an audio signal selected by a user of the smartphone 301.

Referring to FIG. 5A, for example, a display screen 500a of a smartphone 501 (corresponding to the smartphone 301) may output a plurality of objects 500-1 to 500-32, each of which has a button shape. For example, an audio signal (e.g., a so-called loop sound) including a sound repeated with a specified beat may be mapped to each of the plurality of objects 500-1 to 500-32.

If the user selects at least one (e.g., the objects 500-1, 500-7, 500-8, 500-14, 500-18, 500-21, 500-27, and 500-28) of the plurality of objects 500-1 to 500-32, audio signals mapped to the at least one of the plurality of objects 500-1 to 500-32 may be mixed and may then be produced.

In operation 403, the smartphone 301 may receive data, associated with a DJ motion of the user (an example of a gesture of the user), from a smart watch 302 of FIG. 3. For example, the smartphone 301 may receive data, including a movement trace of the smart watch 302 depending on the DJ motion, from the smart watch 302.

Referring to a lower end of FIG. 5B, for example, if the user performs a DJ motion using his or her left hand SOL, a smart watch 502 worn on the left hand SOL may move along a movement trace of the DJ motion. The smart watch 502 may detect the movement tract 540 of the DJ motion through its embedded motion sensor and the like. The smart watch 502 may send data, including the detected movement trace 540 of the DJ motion, to the smartphone 501. Therefore, the smartphone 501 may receive data, associated with the DJ motion, from the smart watch 502.

In operation 405, the smartphone 301 may apply a sound effect, corresponding to the DJ motion to a produced audio signal based on at least part of the data associated with the DJ motion. The sound effect corresponding to the DJ motion may include at least one of stuttering, scratching, delaying, or low fidelity. The sound effect corresponding to the DJ motion is not limited thereto. For example, the sound effect corresponding to the DJ motion may further include a change of an equalizer (EQ), a change of a reproduction speed, insertion of a previously varied audio signal, and the like.

For example, referring to FIG. 5B, a display screen 500b of the smartphone 501 may output a UI including a first region 511 and a second region 512.

Data associated with a touch or touch gesture of the user may be mapped to the first region 511. For example, data associated with a gesture of the user from the smart watch 502 may be mapped to the first region 511. The data associated with the gesture may be two-dimensionally mapped to the first region 511.

According to various embodiments, the first region 511 may correspond to a two-dimensional (2D) parameter space having a quadrangle shape or a rectangular shape. For example, data (e.g., the data including the movement trace 540) associated with a gesture of the user, received from the smart watch 502, may be mapped as a trace 530 to the first region 511. According to various embodiments, the data associated with the touch or the touch gesture may be received through the first region 511 and may be mapped as the trace 530. According to various embodiments, the data associated with the gesture, received from the smart watch 502 or the data associated with the touch or touch gesture, received through the first region 511 may include at least one of positional data, speed data, or directional data of the trace 530 on the first region 511.

The second region 512 may be configured to detect an input for selecting at least one sound effect. For example, the second region 512 may include first buttons 510 (e.g., a stuttering button 510-1, a scratching button 510-2, a low-fidelity (lo-fi) button 510-3, or a delaying button 510-4) for selecting a first sound effect and a second buttons 520 (e.g., a low pass filter (LPF) button 520-1, a band pass filter (BPF) button 520-2, or a high pass filter (HPF) button 520-3) for selecting a second sound effect.

According to various embodiments, the second region 512 may include a first sub-region 512-1 adjacent to a vertical periphery (a Y-axis) of the first region 511 and a second sub-region 512-2 adjacent to a horizontal periphery (an X-axis) of the first region 511.

The first sub-region 512-1 may include a plurality of first buttons 510 (e.g., the stuttering button 510-1, the scratching button 510-2, the lo-fi button 510-3, and the delaying button 510-4) for selecting a plurality of first sound effects. The second sub-region 512-2 may include a plurality of second buttons 520 for selecting a plurality of second sound effects, for example buttons for selecting a plurality of filtering effects (e.g., the LPF button 520-1, the BPF button 520-2, and the HPF button 520-3: commonly called '520'). For example, each of the first buttons 510 or each of the second buttons 520 may correspond to an object implemented with a soft-key.

If at least one of the first buttons 510 is selected, the smartphone 501 may apply the first sound effect to an audio signal based at least in part on data associated with a gesture of the user, received from the smart watch 502, and data associated with a touch or touch gesture of the user, received through the first region 511. For example, the data associated with the gesture of the user, received from the smart watch 502 or the data associated with the touch or touch gesture of the user, received through the first region may include a first number of data types among positional data, speed data, or directional data on the first region 511.

Also, if at least one of the second buttons 520 is selected, the smartphone 501 my apply the second sound effect to an audio signal based at least in part on data associated with a gesture of the user, received from the smart watch 502, and data associated with a touch or touch gesture of the user, received through the first region 511. For example, the data associated with the gesture of the user, received from the smart watch 502 or the data associated with the touch or touch gesture of the user, received through the first region may include a second number of data types among positional data, speed data, or directional data on the first region 511.

Also, according to various embodiments, the smartphone 501 may receive a first input, for selecting at least one of a plurality of first sound effects, from the first sub-region 512-1 (e.g., selection for at least one of the first buttons 510) and may receive a second input, for at least one of a plurality of second sound effects, from the second sub-region 512-2 (e.g., selection for at least one of the second buttons 520).

The smartphone 501 may apply a sound effect to an audio signal based on the first input, the second input, and at least part of the touch or touch gesture received through the first region 511. Alternatively, according to another embodiment, the smartphone 501 may apply a sound effect to an audio signal based on the first input, the second input, and at least part of the data associated with the gesture, received from the smart watch 502.

For example, if the stuttering button 510-1 is selected (e.g., an example in which the first input is received), the smartphone 501 may determine a size of a buffer to be repeated, based on a gesture location (coordinate) on the first region 511 of data associated with a gesture of the user. For example, the smartphone 501 may classify a Y-axis of the first region 511 into five zones and may set the size of the buffer to be repeated to five stages (1 beat, ½ beat, ¼ beat, ⅛ beat, and ¹⁄₁₆ beat).

Also, for example, if the scratching button 510-2 is selected (e.g., an example in which the first input is received), the smartphone 501 may determine a scratching effect based on a gesture location (coordinate), a gesture movement direction, or a gesture movement speed on the first region 511 of data associated with a gesture of the user. For example, the smartphone 501 may determine a scratching direction (a fast-forward direction or a rewind direction) of an audio signal, a speed of scratching, and strength of the scratching based on an upper and lower movement of a gesture of the user on the Y-axis.

Similarly, if the lo-fi button 510-3 or the delaying button 510-4 is selected (e.g., an example in which the first input is received), the smartphone 501 may determine a corresponding sound effect based on at least one of a gesture location (coordinate), a gesture movement direction, or a gesture movement speed on the first region 511 of data associated with a gesture of the user.

Also, for example, if the Low Pass Filter (LPF) LPF button 520-1, the Band Pass Filter (BPF) BPF button 520-2, or the High Pass Filter (HPF) HPF button 520-3 is selected (e.g., an example in which the second input is received), the smartphone 501 may determine a sound effect based on a gesture location (coordinate) on the first region 511 of data associated with a gesture of the user. For example, the smartphone 501 may map a frequency to the X-axis of the first region 511 and may set a cut-off frequency based on an X-axis coordinate of the gesture.

Returning to FIG. 4, in operation 407, the smartphone 301 may output or store an audio signal. The output audio signal represents application of a sound effect on a produced audio signal.

According to various embodiments of the present invention, the electronic device may perform a DJ motion based on a user input received from an external device. For example, as shown in FIG. 3, a user of the electronic device may select an audio signal to be produced with his or her one hand and may apply various sound effects with another hand. Therefore, the user may perform a DJ motion sounding similar to the sound generated when a user plays and scratches/scrubs a vinyl record on a turntable.

Figure 6:
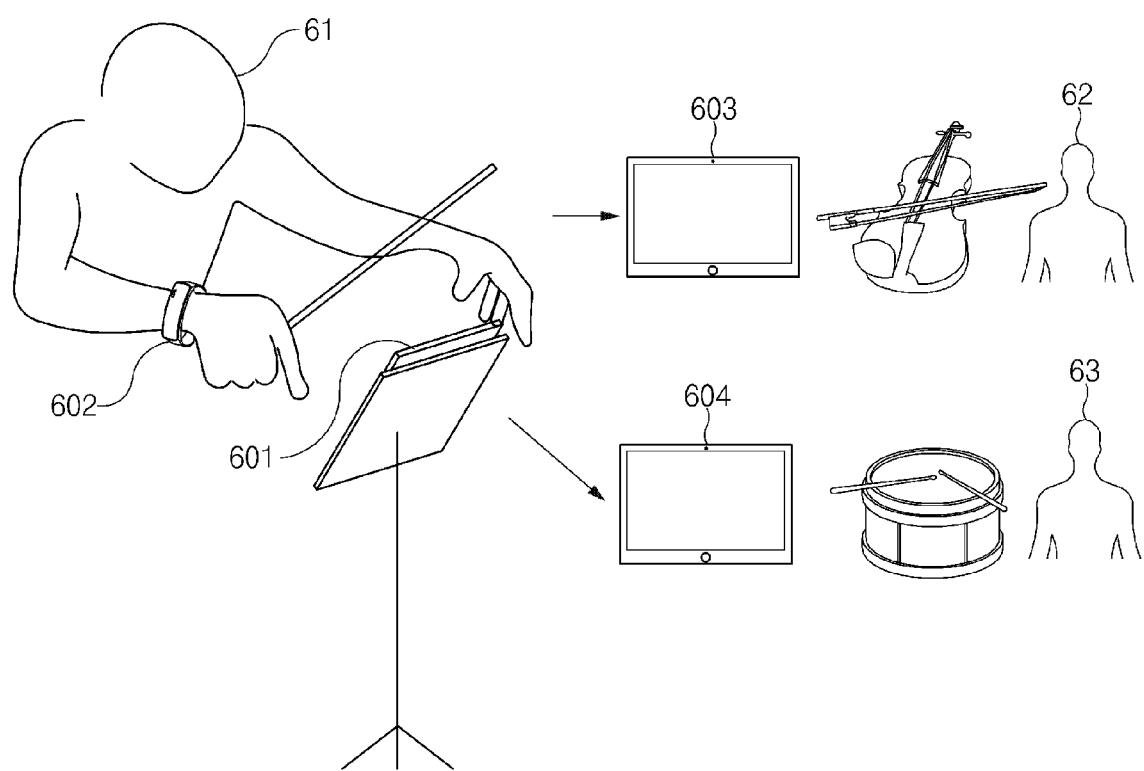
FIG. 6 is a drawing illustrating an environment to which a conducting motion and a sound effect corresponding to the conducting motion are applied, according to an embodiment of the present invention.

FIG. 6 is a drawing illustrating an environment to which a conducting motion and a sound effect corresponding to the conducting motion are applied, according to an embodiment of the present invention.

Referring to FIG. 6, a conductor 61 may conduct a specified performance using an electronic device 601 and a smart watch 602. For example, the electronic device can include a tablet PC 601. The smart watch 602 may correspond to an external device 102 of FIG. 1.

For example, the tablet PC 601 may produce at least one audio signal to be output through its embedded audio module (e.g., its speaker). The conductor 61 may perform a conducting motion (an example of a gesture of the conductor 61) of a specified performance with his or her right hand. For example, the smart watch 602 worn on a right wrist of the conductor 61 may move along a specified track by the conducting motion. This motion (or movement) of the smart watch 602 may be sent, as data associated with the conducting motion, to the tablet PC 601.

The tablet PC 601 may receive data, associated with the conducting motion, from its embedded communication circuit. The tablet PC 601 may apply a sound effect, corresponding to at least part of the conducting motion to the produced audio signal.

Also, the tablet PC 601 may send information including the sound effect applied to the audio signal, to each of tablet PCs 603 and 604. For example, the tablet PCs 603 and 604 may correspond to an electronic device corresponding to a violinist 62 and an electronic device corresponding to a drummer 63, respectively. Each of the tablet PCs 603 and 604 may apply the sound effect, received from the tablet PC 601, to an audio signal loaded into its device.

Figure 7:
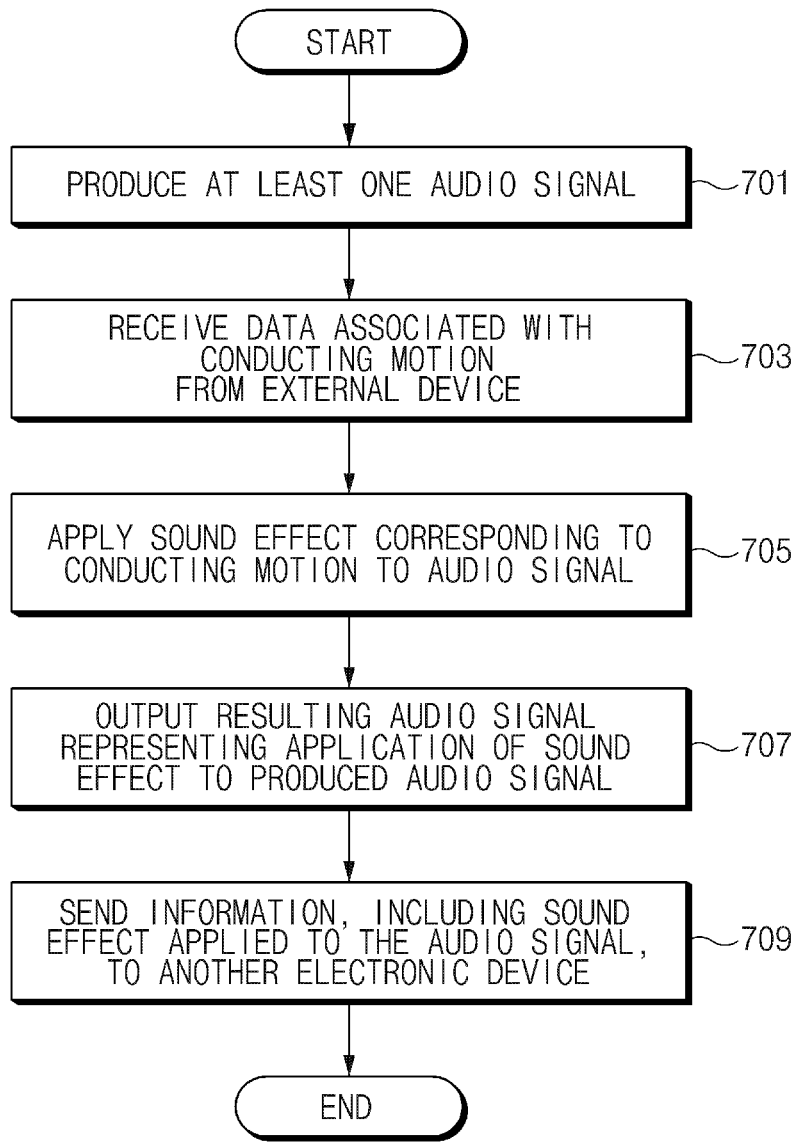
FIG. 7 is a flowchart illustrating a sound providing method based on a conducting motion according to an embodiment of the present invention.

FIG. 7 is a flowchart illustrating a method for providing an audio signal based on a conducting motion according to an embodiment of the present invention.

Referring to FIG. 7, the method for providing and audio signal according to an embodiment of the present invention may include operations 701 to 709. For example, operations 701 to 709 may be performed by an electronic device 101 of FIG. 1 or a table PC 601 shown in FIG. 6. Hereinafter, a description will be given with reference to FIG. 7 using reference denotations of FIG. 6.

In operation 701, an electronic device 601 (e.g., a table PC 601) of FIG. 6 may produce at least one audio signal (e.g., a sound source of a specified performance). According to various embodiments, each of other electronic devices 603 and 604 (e.g., tablet PCs 603 and 604) of FIG. 6 may produce the same audio signal as the electronic device 601.

In operation 703, the electronic device 601 may receive data, associated with a conducting motion of a specified performance (an example of a gesture of a conductor 61 of FIG. 6), from an external device 602 (e.g., a smart watch 602) of FIG. 6. For example, the electronic device 601 may receive data, including a trace of the conducting motion, from the external device 602.

In operation 705, the electronic device 601 may apply a sound effect, corresponding to at least part of the conducting motion, to the produced audio signal. The sound effect corresponding to the at least part of the conducting motion may include at least one of an output speed (reproduction speed), a tone/note, time, dynamics, or a tempo of the audio signal. The sound effect corresponding to the at least part of the conducting motion may further include a variety of other information used to conduct a performance.

In operation 707, the electronic device 601 may output or store an audio signal. The output audio signal represents application of the sound effect onto the produced audio signal.

In operation 709, the electronic device 601 may send information including the sound effect applied in the electronic device 601, to each of the other electronic devices 603 and 604. Each of the other electronic devices 603 and 604 may apply the sound effect, received from the electronic device 601, to produced audio signal, therein.

Meanwhile, according to various embodiments, the external device 602 may directly send an input about a conducting motion to each of the other electronic devices 603 and 604. In this case, for example, each of the electronic devices 603 and 604 may perform operations 701 to 707 described above. Also, according to various embodiments, operation 709 may be performed at the same time that operations 705 and 707 are performed.

Figure 8:
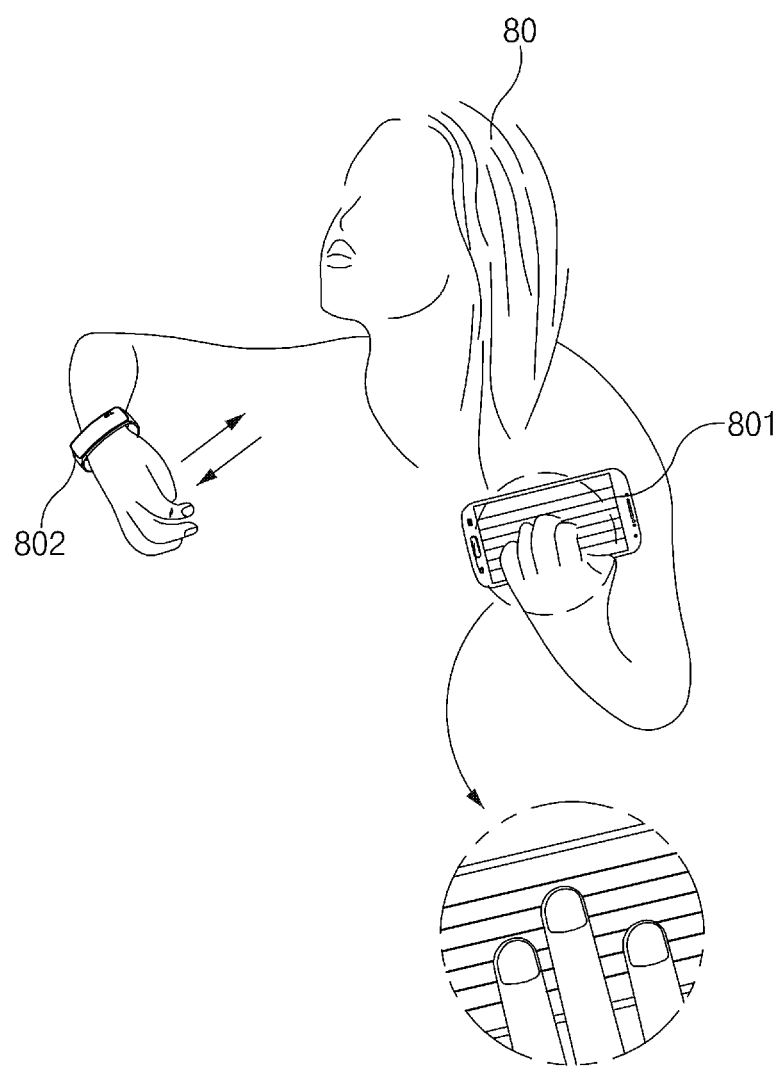
FIG. 8 is a drawing illustrating an environment to which a playing motion and a sound effect corresponding to the playing motion are applied, according to an embodiment of the present invention.

FIG. 8 is a drawing illustrating an environment to which a playing motion and a sound effect corresponding to the playing motion are applied, according to an embodiment of the present invention.

Referring to FIG. 8, a user 80 may play an "air guitar" using his or her smartphone 801 and smart watch 802. For example, the smartphone 801 may correspond to an electronic device 101 of FIG. 1, and the smart watch 802 may correspond to an external device 102 of FIG. 1.

For example, the smartphone 801 may produce at least audio signal to be output through its audio module (e.g., its speaker). Meanwhile, the user 80 may perform a chord fingering motion (an example of a playing motion) of the guitar using the smartphone 801 and may perform a strumming motion (an example of a playing motion) using the smart watch 802.

For example, the user 80 may perform a chord fingering motion by selecting (e.g., touching) at least one of six strings output on a display of the smartphone 801. Also, for example, the user 80 may perform a strumming motion by moving the smart watch 802, worn on his or her right wrist, in a specified way. The motion (or movement) of the smart watch 802 based on the strumming motion may be sent, as data associated with a playing motion, to the smartphone 801.

The smartphone 801 may receive data, associated with a playing motion including motion (or movement) (e.g., strumming) of the smart watch 802, through its embedded communication circuit. The smartphone 801 may insert a corresponding performance audio signal into a produced audio signal (or sound source) based on at least part of the strumming obtained from the smart watch 802 and chord fingering obtained through a touch panel of the display.

Figure 9:
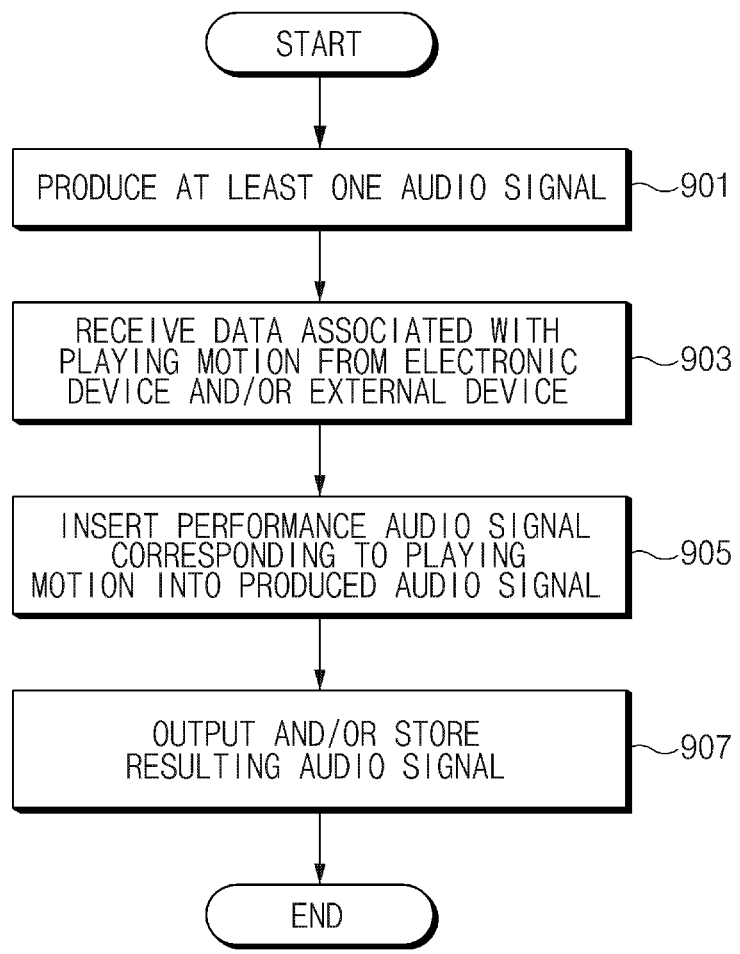
FIG. 9 is a flowchart illustrating a sound providing method based on a playing motion according to an embodiment of the present invention.

FIG. 9 is a flowchart illustrating a method for providing an audio signal based on a playing motion according to an embodiment of the present invention.

Referring to FIG. 9, the method according to an embodiment may include operations 901 to 907. For example, operations 901 to 907 may be performed by an electronic device 101 of FIG. 1 or a smartphone 801 shown in FIG. 8. Hereinafter, a description will be given with reference to FIG. 9 using reference denotations of FIG. 8.

In operation 901, an electronic device 801 (e.g., a smartphone 801) of FIG. 8 may produce at least one audio signal.

In operation 903, the electronic device 801 may obtain data associated with a playing motion of a specified musical instrument from an external device 802 (e.g., a smart watch 802) of FIG. 8 and/or the electronic device 801. For example, the electronic device 801 may obtain data, including a trace of a playing motion (e.g., a right-hand gesture of a user 80 shown in FIG. 8, i.e., strumming) (e.g., a trace of a stroke), from the external device 802. Also, the electronic device 801 may obtain data, associated with a playing motion (e.g., chord fingering), from its embedded touch panel.

In operation 905, the electronic device 801 may insert a performance audio signal corresponding to the playing motion obtained in operation 903 into the produced audio signal in 901. For example, the performance sound may be obtained based on a combination of the playing motion (e.g., the chord fingering) obtained from the electronic device 801 and the playing motion (e.g., the stroke) obtained from the external device 802.

Further, according to various embodiments, the performance sound may be provided regardless of or without a produced audio signal. For example, the electronic device 801 may only provide the performance audio signal by combining the playing motion (e.g., the chord fingering) obtained from the electronic device 801 with the playing motion (e.g., the stroke) obtained from the external device 802 and then synchronizing the combined playing motions. Further, according to various embodiments, the performance audio signal may be provided based on only the playing motion (e.g., the strumming) obtained from the external device 802. For example, the external device 801 may provide the performance sound by combining and synchronizing a preset chord sound or a finger picking sound (e.g., an arpeggio) with a playing motion (e.g., the strumming) of the external device 802.

In operation 907, the electronic device 801 may output or store an audio signal. The output audio signal represents that application of the performance audio signal inserted into the produced audio signal. Further, according to various embodiments, the performance sound may be output through the audio module or may be stored in the memory regardless of the sound source produced as the background music (e.g., in a state where there is no produced audio signal).

As described above, the performance audio signal may be specified based on only a playing motion obtained from one of the electronic device 801 and the external device 802. For example, the electronic device 801 may specify and/or provide the performance sound based on only the playing motion obtained from the external device 802. Alternatively the electronic device 801 may specify and/or provide a performance sound based on only a playing motion obtained from its embedded module (e.g., a motion sensor 160 of FIG. 1).

Figure 10:
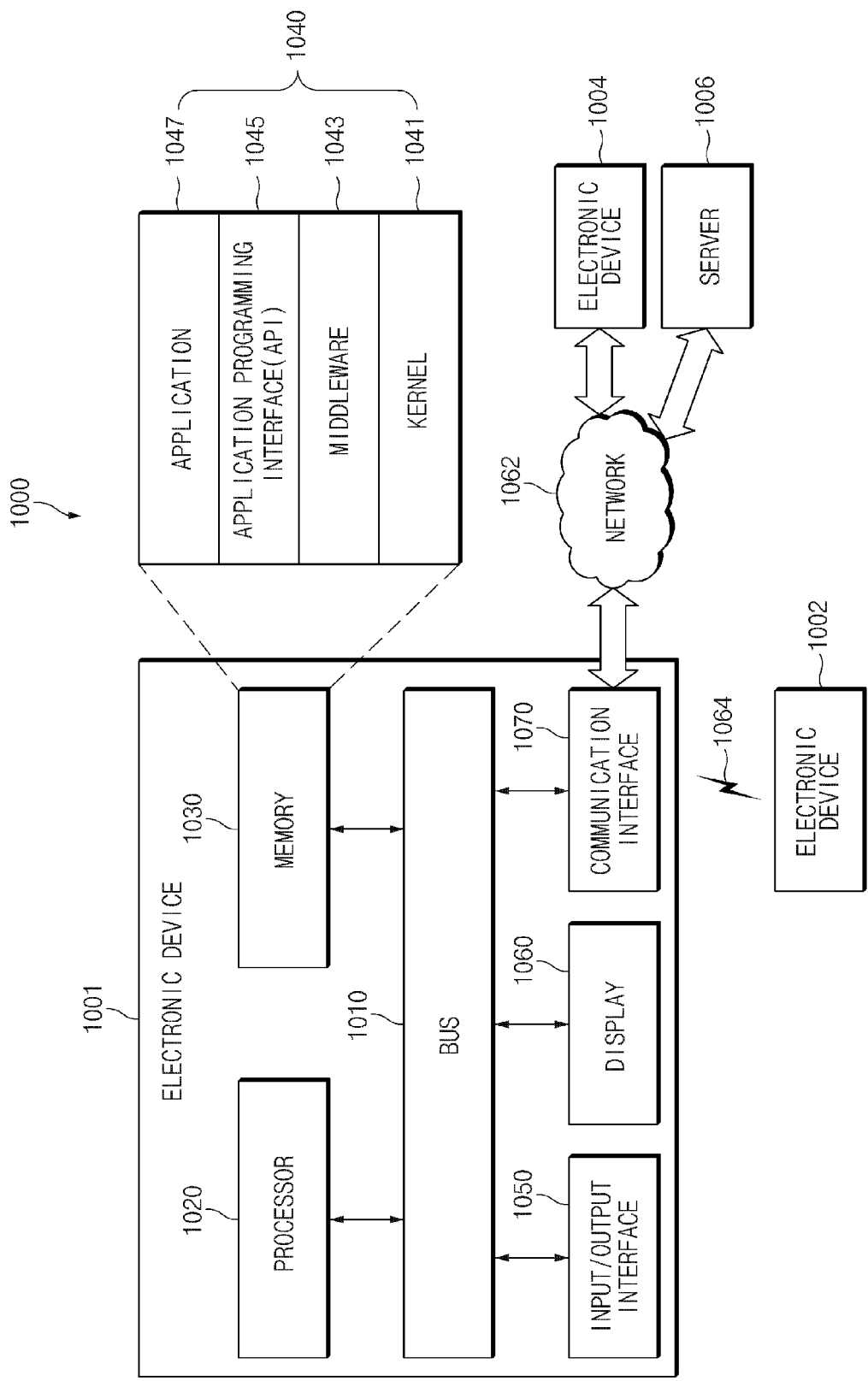
FIG. 10 is a block diagram illustrating a configuration of an electronic device in a network environment according to various embodiments.

FIG. 10 is a block diagram illustrating a configuration of an electronic device in a network environment according to various embodiments.

A description will be given of an electronic device 1001 in a network environment 1000 with reference to FIG. 10 according to various embodiments. The electronic device 1001 may include a bus 1010, a processor 1020, a memory 1030, an input and output interface 1050, a display 1060, and a communication interface 1070. In various embodiments, at least one of the components of the electronic device 1001 may be omitted from the electronic device 1001, and other components may be additionally included in the electronic device 1001.

The bus 1010 (e.g., a bus 110 of FIG. 1) may include, for example, a circuit which connects the components 1020 to 1070 with each other and sends a communication message (e.g., a control message and/or data) between the components 1020 to 1070.

The processor 1020 (e.g., a processor 170 of FIG. 1) may include one or more of a central processing unit (CPU), an application processor (AP), or a communication processor (CP). The processor 1020 may perform, for example, calculation or data processing about control and/or communication of at least another of the components of the electronic device 1001.

The memory 1030 (e.g., a memory 120 of FIG. 1) may include a volatile and/or non-volatile memory. The memory 1030 may store, for example, a command or data associated with at least another of the components of the electronic device 1001. According to an embodiment, the memory 1030 may software and/or a program 1040. The program 1040 may include, for example, a kernel 1041, a middleware 1043, an application programming interface (API) 1045, and/or at least one application program 1047 (or simply "at least one application"), and the like. At least part of the kernel 1041, the middleware 1043, or the API 1045 may be referred to as an operating system (OS).

The kernel 1041 may control or manage, for example, system resources (e.g., the bus 1010, the processor 1020, or the memory 1030, and the like) used to execute an operation or function implemented in the other programs (e.g., the middleware 1043, the API 1045, or the application program 1047). Also, as the middleware 1043, the API 1045, or the application program 1047 accesses a separate component of the electronic device 1001, the kernel 1041 may provide an interface which may control or manage system resources.

The middleware 1043 may play a role as, for example, a go-between such that the API 1045 or the application program 1047 communicates with the kernel 1041 to communicate data with the kernel 1041.

Also, the middleware 1043 may process one or more work requests, received from the at least one application program 1047, in order of priority. For example, the middleware 1043 may assign priority which may use system resources (the bus 1010, the processor 1020, or the memory 1030, and the like) of the electronic device 1001 to at least one of the at least one application program 1047. For example, the middleware 1043 may perform scheduling or load balancing for the one or more work requests by processing the one or more work requests in order of priority assigned to the at least one of the at least one application program 1047.

The API 1045 may be, for example, an interface in which the application program 1047 controls a function provided from the kernel 1041 or the middleware 1043. For example, the API 1045 may include at least one interface or function (e.g., a command) for file control, window control, image processing, or text control, and the like.

The input and output interface 1050 may play a role as, for example, an interface which may send a command or data, input from a user or another external device, to another component (or other components) of the electronic device 1001. Also, the input and output interface 1050 may output a command or data, received from another component (or other components) of the electronic device 1001, to the user or the other external device.

The display 1060 (e.g., a display 160 of FIG. 1) may include, for example, a liquid crystal display (LCD), a light emitting diode (LED) display, an organic LED (OLED) display, a microelectromechanical systems (MEMS) display, or an electronic paper display. The display 1060 may display, for example, a variety of content (e.g., text, images, videos, icons, or symbols, and the like) to the user. The display 1060 may include a touch screen, and may receive, for example, a touch, a gesture, proximity, or a hovering input using an electronic pen or part of a body of the user.

The communication interface 1070 (e.g., a communication circuit 140 of FIG. 1) may establish communication between, for example, the electronic device 1001 and an external device (e.g., a first external electronic device 1002, a second external electronic device 1004, a server 1006, a first external device 102 of FIG. 1, or a second external device 103 of FIG. 1). For example, the communication interface 1070 may connect to a network 1062 through wireless communication or wired communication and may communicate with the external device (e.g., the second external electronic device 1004 or the server 1006).

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1064. The local-area communication 1064 may include, for example, at least one of wireless-fidelity (Wi-Fi) communication, Bluetooth (BT) communication, near field communication (NFC) communication, or global navigation satellite system (GNSS) communication, and the like. The GNSS may include, for example, at least one of a global positioning system (GPS), a Glonass, a Beidou navigation satellite system (hereinafter referred to as "Beidou"), or a Galileo (i.e., the European global satellite-based navigation system). Hereinafter, the "GPS" used herein may be interchangeably with the "GNSS". The wired communication may include, for example, at least one of universal serial bus (USB) communication, high definition multimedia interface (HDMI) communication, recommended standard 232 (RS-232) communication, power line communication, or plain old telephone service (POTS) communication, and the like. The network 1062 may include a telecommunications network, for example, at least one of a computer network (e.g., a local area network (LAN) or a wide area network (WAN)), the Internet, or a telephone network.

Each of the first and second external electronic devices 1002 and 1004 (e.g., the first external device 102 and the second external device 103) may be the same as or different device from the electronic device 1001. According to an embodiment, the server 1006 may include a group of one or more servers. According to various embodiments, all or some of operations executed in the electronic device 1001 may be executed in another electronic device or a plurality of electronic devices (e.g., the first external electronic device 1002, the second external electronic device 1004, or the server 1006). According to an embodiment, if the electronic device 1001 should perform any function or service automatically or according to a request, it may request another device (e.g., the first external electronic device 1002, the second external electronic device 1004, or the server 1006) to perform at least part of the function or service, rather than executing the function or service for itself or in addition to the function or service. The other electronic device (e.g., the first external electronic device 1002, the second external electronic device 1004, or the server 1006) may execute the requested function or the added function and may transmit the executed result to the electronic device 1001. The electronic device 1001 may process the received result without change or additionally and may provide the requested function or service. For this purpose, for example, cloud computing technologies, distributed computing technologies, or client-server computing technologies may be used.

Figure 11:
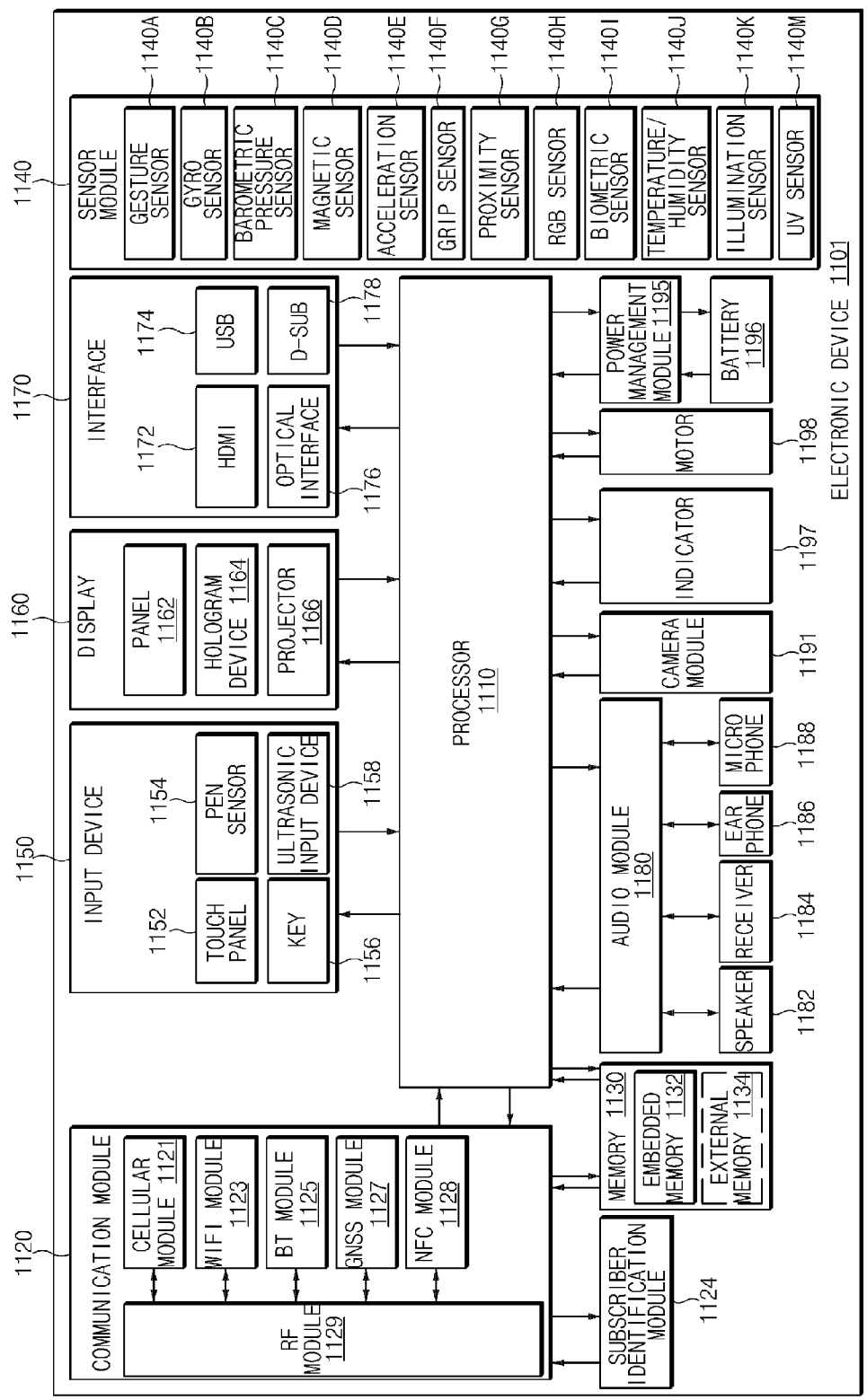
FIG. 11 is a block diagram illustrating a configuration of an electronic device according to various embodiments.

FIG. 11 is a block diagram illustrating a configuration of an electronic device according to various embodiments.

Referring to FIG. 11, an electronic device 1101 may include, for example, all or part of an electronic device 1001 shown in FIG. 10. The electronic device 1101 may include one or more processors 1110 (e.g., application processors (APs)), a communication module 1120, a subscriber identification module (SIM) 1124, a memory 1130, a sensor module 1140, an input device 1150, a display 1160, an interface 1170, an audio module 1180, a camera module 1191, a power management module 1195, a battery 1196, an indicator 1197, and a motor 1198.

The processor 1110 may execute, for example, an operating system (OS) or an application program to control a plurality of hardware or software components connected thereto and may process and compute a variety of data. The processor 1110 may be implemented with, for example, a system on chip (SoC). According to an embodiment, the processor 1110 may include a graphic processing unit (GPU) (not shown) and/or an image signal processor (not shown). The processor 1110 may include at least some (e.g., a cellular module 1121) of the components shown in FIG. 11. The processor 1110 may load a command or data, received from at least one of other components (e.g., a non-volatile memory), to a volatile memory to process the data and may store various data in a non-volatile memory.

The communication module 1120 may have the same or similar configuration to a communication interface 1070 of FIG. 10. The communication module 1120 may include, for example, the cellular module 1121, a wireless-fidelity (Wi-Fi) module 1123, a Bluetooth (BT) module 1125, a global navigation satellite system (GNSS) module 1127 (e.g., a GPS module, a Glonass module, a Beidou module, or a Galileo module), a near field communication (NFC) module 1128, and a radio frequency (RF) module 1129.

The cellular module 1121 may provide, for example, a voice call service, a video call service, a text message service, or an Internet service, and the like through a communication network. According to an embodiment, the cellular module 1121 may identify and authenticate the electronic device 1101 in a communication network using the SIM 1124 (e.g., a SIM card). According to an embodiment, the cellular module 1121 may perform at least some of functions which may be provided by the processor 1110. According to an embodiment, the cellular module 1121 may include a communication processor (CP).

The Wi-Fi module 1123, the BT module 1125, the GNSS module 1127, or the NFC module 1128 may include, for example, a processor for processing data communicated through the corresponding module. According to various embodiments, at least some (e.g., two or more) of the cellular module 1121, the Wi-Fi module 1123, the BT module 1125, the GNSS module 1127, or the NFC module 1128 may be included in one integrated chip (IC) or one IC package. In certain embodiments, external devices 102, 103 can communicate with the electronic device 101 using BlueTooth.

The RF module 1129 may communicate, for example, a communication signal (e.g., an RF signal). Though not shown, the RF module 1129 may include, for example, a transceiver, a power amplifier module (PAM), a frequency filter, or a low noise amplifier (LNA), or an antenna, and the like. According to another embodiment, at least one of the cellular module 1121, the Wi-Fi module 1123, the BT module 1125, the GNSS module 1127, or the NFC module 1128 may communicate an RF signal through a separate RF module.

The SIM 1124 may include, for example, a card which includes a SIM and/or an embedded SIM. The SIM 1124 may include unique identification information (e.g., an integrated circuit card identifier (ICCID)) or subscriber information (e.g., an international mobile subscriber identity (IMSI)).

The memory 1130 (e.g., a memory 1030 of FIG. 10) may include, for example, an embedded memory 1132 or an external memory 1134. The embedded memory 1132 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1134 may include a flash drive, for example, a compact flash (CF), a secure digital (SD), a micro-SD, a mini-SD, an extreme digital (xD), a multimedia card (MMC), or a memory stick, and the like. The external memory 1134 may operatively and/or physically connect with the electronic device 1101 through various interfaces.

The sensor module 1140 may measure, for example, a physical quantity or may detect an operation state of the electronic device 1101, and may convert the measured or detected information to an electric signal. The sensor module 1140 may include at least one of, for example, a gesture sensor 1140A, a gyro sensor 1140B, a barometric pressure sensor 1140C, a magnetic sensor 1140D, an acceleration sensor 1140E, a grip sensor 1140F, a proximity sensor 1140G, a color sensor 1140H (e.g., red, green, blue (RGB) sensor), a biometric sensor 1140I, a temperature/humidity sensor 1140J, an illumination sensor 1140K, or an ultraviolet (UV) sensor 1140M. Additionally or alternatively, the sensor module 1140 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 1140 may further include a control circuit for controlling at least one or more sensors included therein. In various embodiments, the electronic device 1101 may further include a processor configured to control the sensor module 1140, as part of the processor 1110 or to be independent of the processor 1110. While the processor 1110 is in a sleep state, the electronic device 1101 may control the sensor module 1140.

The input device 1150 may include, for example, a touch panel 1152, a (digital) pen sensor 1154, a key 1156, or an ultrasonic input unit 1158. The touch panel 1152 may use, for example, at least one of a capacitive type, a resistive type, an infrared type, or an ultrasonic type. Also, the touch panel 1152 may include a control circuit. The touch panel 1152 may further include a tactile layer and may provide a tactile reaction to a user.

The (digital) pen sensor 1154 may be, for example, part of the touch panel 1152 or may include a separate sheet for recognition. The key 1156 may include, for example, a physical button, an optical key, or a keypad. The ultrasonic input unit 1158 may allow the electronic device 1101 to detect an ultrasonic wave generated by an input tool, through a microphone (e.g., a microphone 1188) and to verify data corresponding to the detected ultrasonic wave.

The display 1160 (e.g., a display 1060 of FIG. 10) may include a panel 1162, a hologram device 1164, or a projector 1166. The panel 1162 may include the same or similar configuration to the display 1160. The panel 1162 may be implemented to be, for example, flexible, transparent, or wearable. The panel 1162 and the touch panel 1152 may be integrated into one module. The hologram device 1164 may show a stereoscopic image in a space using interference of light. The projector 1166 may project light onto a screen to display an image. The screen may be positioned, for example, inside or outside the electronic device 1101. According to an embodiment, the display 1160 may further include a control circuit for controlling the panel 1162, the hologram device 1164, or the projector 1166.

In certain embodiments, display 1160 can display any of the user interfaces described in FIGS. 3, 5A, 5B, and 8.

The interface 1170 may include, for example, a high-definition multimedia interface (HDMI) 1172, a universal serial bus (USB) 1174, an optical interface 1176, or a D-subminiature 1178. The interface 1170 may be included in, for example, a communication interface 1070 shown in FIG. 10. Additionally or alternatively, the interface 1170 may include, for example, a mobile high definition link (MHL) interface, an SD card/multimedia card (MMC) interface, or an infrared data association (IrDA) standard interface.

The audio module 1180 may interchangeably convert a sound into an electric signal. At least some of components of the audio module 1180 may be included in, for example, an input and output interface 1050 shown in FIG. 10. The audio module 1180 may process sound information input or output through, for example, a speaker 1182, a receiver 1184, an earphone 1186, or the microphone 1188, and the like.

The camera module 1191 may be a device which captures a still image and a moving image. According to an embodiment, the camera module 1191 may include one or more image sensors (not shown) (e.g., a front sensor or a rear sensor), a lens (not shown), an image signal processor (ISP) (not shown), or a flash (not shown) (e.g., an LED or a xenon lamp).

The power management module 1195 may manage, for example, power of the electronic device 1101. According to an embodiment, though not shown, the power management module 1195 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1196 and voltage, current, or temperature thereof while the battery 1196 is charged. The battery 1196 may include, for example, a rechargeable battery or a solar battery.

The indicator 1197 may display a specific state of the electronic device 1101 or part (e.g., the processor 1110) thereof, for example, a booting state, a message state, or a charging state, and the like. The motor 1198 may convert an electric signal into mechanical vibration and may generate vibration or a haptic effect, and the like. Though not shown, the electronic device 1101 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

Figure 12:
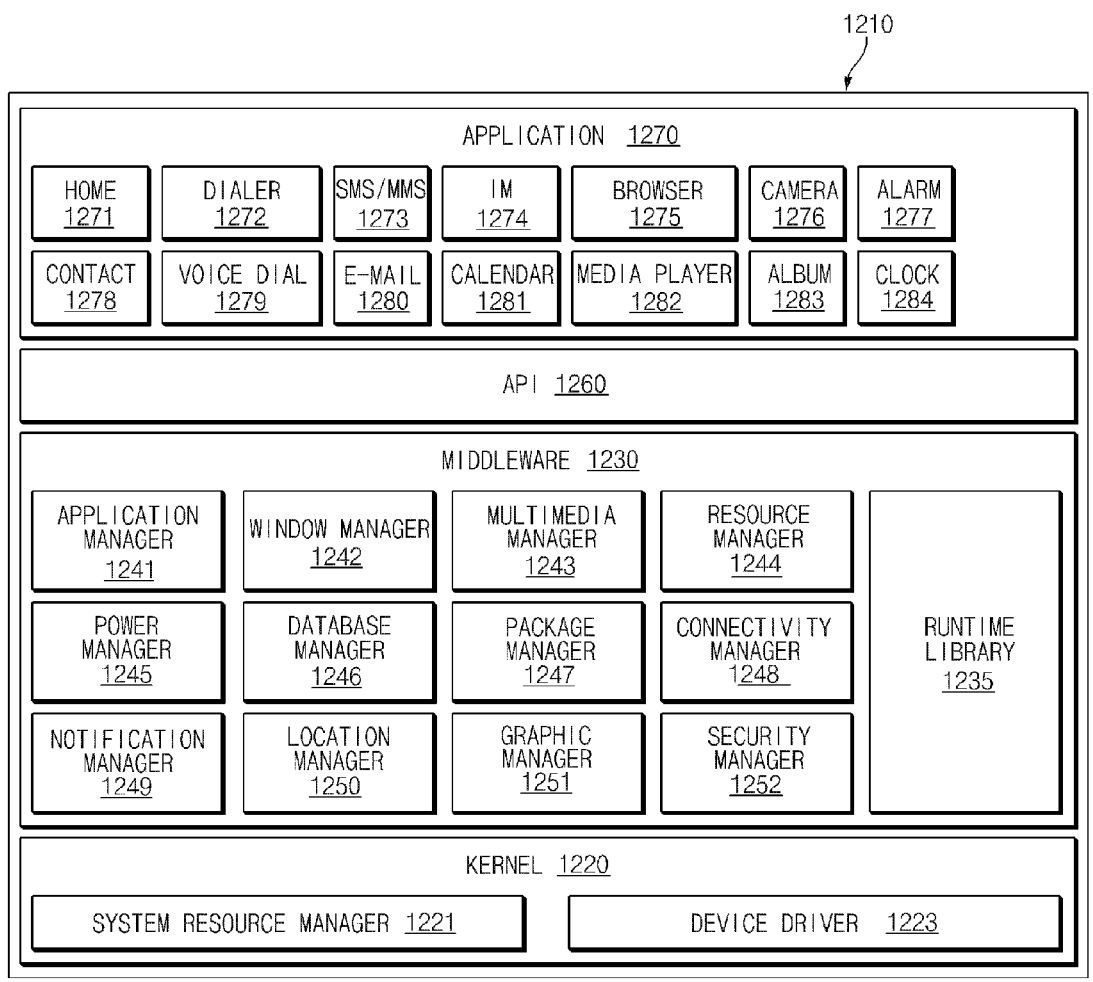
FIG. 12 is a block diagram illustrating a configuration of a program module according to various embodiments.

FIG. 12 is a block diagram illustrating a configuration of a program module according to various embodiments.

Referring to FIG. 12, according to an embodiment, a program module 1210 (e.g., a program 1040 of FIG. 10) may include an operating system (OS) for controlling resources associated with an electronic device (e.g., an electronic device 1001 of FIG. 10) and/or various applications (e.g., at least one application program 1047 of FIG. 10) which are executed on the OS. The OS may be, for example, Android, iOS, Windows, Symbian, Tizen, or Bada, and the like.

The program module 1210 may include a kernel 1220, a middleware 1230, an application programming interface (API) 1260, and/or at least one application 1270. At least part of the program module 1210 may be preloaded on the electronic device, or may be downloaded from an external electronic device (e.g., a first external electronic device 1002, a second external electronic device 1004, or a server 1006, and the like of FIG. 10).

The kernel 1220 (e.g., a kernel 1041 of FIG. 10) may include, for example, a system resource manager 1221 and/or a device driver 1223. The system resource manager 1221 may control, assign, or collect, and the like system resources. According to an embodiment, the system resource manager 1221 may include a process management unit, a memory management unit, or a file system management unit, and the like. The device driver 1223 may include, for example, a display driver, a camera driver, a Bluetooth (BT) driver, a shared memory driver, a universal serial bus (USB) driver, a keypad driver, a wireless-fidelity (Wi-Fi) driver, an audio driver, or an inter-process communication (IPC) driver.

The middleware 1230 (e.g., a middleware 1043 of FIG. 10) may provide, for example, functions the application 1270 needs in common, and may provide various functions to the application 1270 through the API 1260 such that the application 1270 efficiently uses limited system resources in the electronic device. According to an embodiment, the middleware 1230 (e.g., the middleware 1043) may include at least one of a runtime library 1235, an application manager 1241, a window manager 1242, a multimedia manager 1243, a resource manager 1244, a power manager 1245, a database manager 1246, a package manager 1247, a connectivity manager 1248, a notification manager 1249, a location manager 1250, a graphic manager 1251, or a security manager 1252.

The runtime library 1235 may include, for example, a library module used by a compiler to add a new function through a programming language while the application 1270 is executed. The runtime library 1235 may perform a function about input and output management, memory management, or an arithmetic function.

The application manager 1241 may manage, for example, a life cycle of at least one of the at least one application 1270. The window manager 1242 may manage graphic user interface (GUI) resources used on a screen of the electronic device. The multimedia manager 1243 may ascertain a format necessary for reproducing various media files and may encode or decode a media file using a codec corresponding to the corresponding format. The resource manager 1244 may manage source codes of at least one of the at least one application 1270, and may manage resources of a memory or a storage space, and the like.

The power manager 1245 may act together with, for example, a basic input/output system (BIOS) and the like, may manage a battery or a power source, and may provide power information necessary for an operation of the electronic device. The database manager 1246 may generate, search, or change a database to be used in at least one of the at least one application 1270. The package manager 1247 may manage installation or update of an application distributed by a type of a package file.

The connectivity manager 1248 may manage, for example, wireless connection such as Wi-Fi connection or BT connection, and the like. The notification manager 1249 may display or notify events, such as an arrival message, an appointment, and proximity notification, by a method which is not disturbed to the user. The location manager 1250 may manage location information of the electronic device. The graphic manager 1251 may manage a graphic effect to be provided to the user or a user interface (UI) related to the graphic effect. The security manager 1252 may provide all security functions necessary for system security or user authentication, and the like. According to an embodiment, when the electronic device (e.g., an electronic device 1001 of FIG. 10) has a phone function, the middleware 1230 may further include a telephony manager (not shown) for managing a voice or video communication function of the electronic device.

The middleware 1230 may include a middleware module which configures combinations of various functions of the above-described components. The middleware 1230 may provide a module which specializes according to kinds of OSs to provide a differentiated function. Also, the middleware 1230 may dynamically delete some of old components or may add new components.

The API 1260 (e.g., an API 1045 of FIG. 10) may be, for example, a set of API programming functions, and may be provided with different components according to OSs. For example, in case of Android or iOS, one API set may be provided according to platforms. In case of Tizen, two or more API sets may be provided according to platforms.

The application 1270 (e.g., an application program 1047 of FIG. 10) may include one or more of, for example, a home application 1271, a dialer application 1272, a short message service/multimedia message service (SMS/MMS) application 1273, an instant message (IM) application 1274, a browser application 1275, a camera application 1276, an alarm application 1277, a contact application 1278, a voice dial application 1279, an e-mail application 1280, a calendar application 1281, a media player application 1282, an album application 1283, a clock application 1284, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 1270 may include an application (hereinafter, for better understanding and ease of description, referred to as "information exchange application") for exchanging information between the electronic device (e.g., the electronic device 1001) and an external electronic device (e.g., the first external electronic devices 1002 or the second external electronic device 1004). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic devices 1002 or the second external electronic device 1004). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic devices 1002 or the second external electronic device 1004) which communicates with the electronic device, an application which operates in the external electronic device, or a service (e.g., a call service or a message service) provided from the external electronic device.

According to an embodiment, the application 1270 may include an application (e.g., the health card application of a mobile medical device) which is preset according to attributes of the external electronic device (e.g., the first external electronic devices 1002 or the second external electronic device 1004). According to an embodiment of the present disclosure, the application 1270 may include an application received from the external electronic device (e.g., the server 1006, the first external electronic devices 1002, or the second external electronic device 1004). According to an embodiment of the present disclosure, the application 1270 may include a preloaded application or a third party application which may be downloaded from a server. Names of the components of the program module 1210 according to various embodiments of the present disclosure may differ according to kinds of OSs.

According to various embodiments, at least part of the program module 1210 may be implemented with software, firmware, hardware, or at least two or more combinations thereof. At least part of the program module 1210 may be implemented (e.g., executed) by, for example, a processor (e.g., a processor 1110 of FIG. 11). At least part of the program module 1210 may include, for example, a module, a program, a routine, sets of instructions, or a process, and the like for performing one or more functions.

An electronic device according to an embodiment of the present invention may include a display, a memory for storing at least one sound source, a communication circuit configured to establish wireless communication with an external device, and a processor electrically connected with the display, the memory, and the communication circuit. The memory may store instructions for, when executed, causing the processor to load the at least one sound source, receive data associated with a gesture of a user through the communication circuit from the external device, apply a sound effect or a variation of the sound effect, selected based on at least part of the data associated with the gesture, to the sound source, and output or store a sound based on the sound source to which the sound effect or the variation of the sound effect is applied.

Also, in the electronic device according to various embodiments of the present invention, the sound effect may include varying the sound source based on the at least part of the data associated with the gesture.

Also, in the electronic device according to various embodiments of the present invention, the sound effect may include inserting a sound, corresponding to the at least part of the data associated with the gesture, into the sound source.

Also, in the electronic device according to various embodiments of the present invention, the gesture may include a playing motion of a specified musical instrument. The instructions, when executed, may cause the processor to insert a performance sound of the specified musical instrument, corresponding to the playing motion, into the sound source.

Also, in the electronic device according to various embodiments of the present invention, the gesture may include a conducting motion of a specified musical instrument. The instructions, when executed, may cause the processor to apply a variation of a sound effect, corresponding to the conducting motion, to the sound source.

Also, in the electronic device according to various embodiments of the present invention, the variation of the sound effect may include at least one of an output speed, a tonality, dynamics, a tempo, or time of the sound source.

Also, in the electronic device according to various embodiments of the present invention, the gesture may include a DJ motion. The instructions, when executed, may cause the processor to apply a sound effect, corresponding to the DJ motion, and a variation of the sound effect to the sound source.

Also, in the electronic device according to various embodiments of the present invention, the sound effect may include at least one of stuttering, scratching, delaying, or low fidelity.

Also, the electronic device according to various embodiments of the present invention may further include a motion sensor configured to sense a gesture or movement (or motion) of the electronic device. The instructions, when executed, may cause the processor to further receive sensing data by the motion sensor.

Also, in the electronic device according to various embodiments of the present invention, the instructions, when executed, may cause the processor to send information including the sound effect or the variation of the sound effect which is applied to the sound source, to another electronic device through the communication circuit.

Also, an electronic device according to various embodiments of the present invention may include a display, a memory for storing at least one sound source, a communication circuit configured to establish wireless communication with an external device, and a processor electrically connected with the display, the memory, and the communication circuit. The memory may store instructions for, when executed, causing the processor to provide a user interface (UI), including a first region configured to detect a touch or touch gesture and a second region configured to detect an input for selecting at least one sound effect, on the display, load the at least one sound source, receive data associated with the touch or touch gesture through the first region, apply a sound effect or a variation of the sound effect, selected based on at least part of the data associated with the touch or touch gesture, to the sound source, and output or store a sound based on the sound source to which the sound effect or the variation of the sound effect is applied.

Also, in the electronic device according to various embodiments of the present invention, the data associated with the touch or touch gesture may include at least one of positional data, speed data, or directional data on the first region of the touch or touch gesture.

Also, in the electronic device according to various embodiments of the present invention, the second region may include a first button for selecting a first sound effect and a second button for selecting a second sound effect. If the first button is selected, the instructions, when executed, may cause the processor to apply the first sound effect or a variation of the first sound effect to the sound source based on a first number of data types among the positional data, the speed data, or the directional data. If the second button is selected, the instructions, when executed, may cause the processor to apply the second sound effect or a variation of the second sound effect to the sound source based on a second number of data types, different from the first number of data types, among the positional data, the speed data, or the directional data.

Also, in the electronic device according to various embodiments of the present invention, the first region may have a quadrangle or a rectangle shape. The second region may include a first sub-region adjacent to a vertical periphery of the first region and a second sub-region adjacent to a horizontal periphery of the first region.

Also, in the electronic device according to various embodiments of the present invention, the first sub-region may include a plurality of first buttons for selecting a plurality of first sound effects. The second sub-region may include a plurality of second buttons for selecting a plurality of second sound effects.

Also, in the electronic device according to various embodiments of the present invention, the plurality of first buttons may include a stuttering button, a scratching button, a low-fidelity button, a delaying button, or a combination of the stuttering button, the scratching button, the low-fidelity button, and the delaying button. The plurality of second buttons may include buttons for selecting a plurality of filtering effects.

Also, in the electronic device according to various embodiments of the present invention, the instructions, when executed, may cause the processor to receive a first input, for selecting at least one of the plurality of first sound effects, from the first sub-region, to receive a second input, for selecting at least one of the plurality of second sound effects, from the second sub-region, and to apply a sound effect or a variation of the sound effect to the sound source based on the first input, the second input, and at least part of data associated with the touch or touch gesture received through the first region.

A sound providing method according to an embodiment of the present invention may include loading at least one sound source, receiving data, associated with a gesture of a user from the external device, applying a sound effect or a variation of the sound effect, selected based on at least part of the data associated with the gesture, to the sound source, and outputting or storing a sound based on the sound source to which the sound effect or the variation of the sound effect is applied.

Also, in the sound providing method according to various embodiments of the present invention, the applying of the sound effect may include varying the sound source based on the at least part of the data associated with the gesture.

Also, in the sound providing method according to various embodiments of the present invention, the applying of the sound effect may include inserting a sound, corresponding to the at least part of the data associated with the gesture, into the sound source.

Also, in the sound providing method according to various embodiments of the present invention, the gesture may include a playing motion of a specified musical instrument. The applying of the sound effect may include inserting a performance sound of the specified musical instrument, corresponding to the playing motion, into the sound source.

Also, in the sound providing method according to various embodiments of the present invention, the gesture may include a conducting motion of a specified musical instrument. The applying of the variation of the sound effect may include applying a variation of a sound effect, corresponding to the conducting motion, to the sound source.

Also, in the sound providing method according to various embodiments of the present invention, the variation of the sound effect may include at least one of an output speed, a tonality, dynamics, a tempo, or time of the sound source.

Also, in the sound providing method according to various embodiments of the present invention, the gesture may include a DJ motion. The applying of the sound effect or the variation of the sound effect may include applying a sound effect, corresponding to the DJ motion, and a variation of the sound effect to the sound source.

Also, in the sound providing method according to various embodiments of the present invention, the sound effect may include at least one of stuttering, scratching, delaying, or low fidelity.

Also, the sound providing method according to various embodiments of the present invention may further include generating sensing data by sensing a gesture or movement (or motion) of the electronic device. The receiving of the data associated with the gesture of the user may include further receiving sensing data by a motion sensor of the electronic device.

Also, the sound providing method according to various embodiments of the present invention may further include sending information including the sound effect or the variation of the sound effect which is applied to the sound source, to another electronic device.

A computer-readable recording medium stores instructions executed by at least one processor. The instructions may be configured to load at least one sound source, receive data associated with a gesture of a user from the external device, apply a sound effect or a variation of the sound effect, selected based on at least part of the data associated with the gesture, to the sound source, and output or store a sound based on the sound source to which the sound effect or the variation of the sound effect is applied.

Also, in the instructions of the computer-readable recording medium according to various embodiments of the present invention, the applying of the sound effect may include varying the sound source based on the at least part of the data associated with the gesture.

Also, in the instructions of the computer-readable recording medium according to various embodiments of the present invention, the applying of the sound effect may include inserting a sound, corresponding to the at least part of the data associated with the gesture, into the sound source.

Also, in the instructions of the computer-readable recording medium according to various embodiments of the present invention, the gesture may include a playing motion of a specified musical instrument. The applying of the sound effect may include inserting a performance sound of the specified musical instrument, corresponding to the playing motion, into the sound source.

Also, in the instructions of the computer-readable recording medium according to various embodiments of the present invention, the gesture may include a conducting motion of a specified musical instrument. The applying of the variation of the sound effect may include applying a variation of a sound effect, corresponding to the conducting motion, into the sound source.

Also, in the instructions of the computer-readable recording medium according to various embodiments of the present invention, the variation of the sound effect may include at least one of an output speed, a tonality, dynamics, a tempo, or time of the sound source.

Also, in the instructions of the computer-readable recording medium according to various embodiments of the present invention, the gesture may include a DJ motion. The applying of the sound effect or the variation of the sound effect may include applying a sound effect, corresponding to the DJ motion, and a variation of the sound effect to the sound source.

Also, in the instructions of the computer-readable recording medium according to various embodiments of the present invention, the sound effect may include at least one of stuttering, scratching, delaying, or low fidelity.

Also, the instructions of the computer-readable recording medium according to various embodiments of the present invention may further include generating sensing data by sensing a gesture or movement (or motion) of the electronic device. The receiving of the data associated with the gesture of the user may include further receiving sensing data by a motion sensor of the electronic device.

Also, the instructions of the computer-readable recording medium according to various embodiments of the present invention may further include sending information including the sound effect or the variation of the sound effect which is applied to the sound source, to another electronic device.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments, at least part of a device (e.g., modules or the functions) or a method (e.g., operations) may be implemented with, for example, instructions stored in computer-readable storage media which have a program module. When the instructions are executed by a processor (e.g., a processor 170 of FIG. 1), one or more processors may perform functions corresponding to the instructions. The computer-readable storage media may be, for example, a memory 120 of FIG. 1.

The computer-readable storage media may include a hard disc, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a ROM, a random access memory (RAM), or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

According to various embodiments, the electronic device may apply various sound effects to the sound source based on the gesture of the external device.

Embodiments of the present disclosure described and shown in the drawings are provided as examples to describe technical content and help understanding but do not limit the scope of the present disclosure. Accordingly, it should be interpreted that besides the embodiments listed herein, all modifications or modified forms derived based on the technical ideas of the present disclosure are included in the scope of the present disclosure as defined in the claims, and their equivalents.

What is claimed is:

1. An electronic device, comprising;
a display;
a memory for storing at least one audio signal;
a communication circuit configured to establish wireless communication with an external device; and
a processor electrically connected with the display, the memory, and the communication circuit,
wherein the memory stores instructions for, when executed, causing the processor to:
produce the at least one audio signal,
provide a user interface (UI) including a specified region on the display;
receive from the external device, an indicator of a gesture detected by the external device;
display a trace based on the gesture detected and received from the external device on the display of the electronic device;
apply a sound effect, selected based at least in part on the gesture, to the produced at least one audio source, and
output or store a resulting audio signal, wherein the resulting audio signal represents application of the sound effect to the produced at least one audio signal.

2. The electronic device of claim 1, wherein the sound effect comprises varying the produced at least one audio signal based at least in part on the gesture.

3. The electronic device of claim 1, wherein the sound effect comprises inserting a performance audio signal, corresponding at least in part to the gesture, into the produced at least one audio signal.

4. The electronic device of claim 1, wherein the gesture comprises a gesture simulating operation of a musical instrument, and
wherein the instructions, when executed, cause the processor to insert a performance audio signal of the musical instrument, corresponding to the gesture simulating operation of the musical instrument, into the produced at least one audio signal.

5. The electronic device of claim 1, wherein the gesture comprises a gesture simulating a conducting motion, and wherein the instructions, when executed, cause the processor to vary producing the at least one audio signal based at least in part on data associated with the gesture simulating the conducting motion.

6. The electronic device of claim 5, wherein varying producing the at least one audio signal comprises varying at least one of an output speed, a tone, note, dynamics, tempo, and time.

7. The electronic device of claim 1, wherein the gesture comprises data associated with a finger trace gesture, and wherein the instructions, when executed, cause the processor to apply a sound effect corresponding to the data associated with the finger trace to the produced at least one audio signal.

8. The electronic device of claim 7, wherein the sound effect comprises at least one of stuttering, scratching, delaying, or low fidelity.

9. The electronic device of claim 1, further comprising:
a motion sensor configured to sense the gesture or movement of the electronic device, wherein the instructions, when executed, cause the processor to further receive sensing data by the motion sensor.

10. The electronic device of claim 1, wherein the instructions, when executed, further cause the processor to send information, including the sound effect to another electronic device through the communication circuit.

11. A method comprising:
establishing, by an electronic device, wireless communication with an external device;
producing, by the electronic device, at least one audio signal;
providing, by the electronic device, a user interface (UI) including a specified region on a display;
receiving, from the external device, an indicator of a gesture detected by the external device;
displaying, on the display of the electronic device, a trace based on the gesture detected and received from the external device;
applying, by the electronic device, a sound effect based at least in part on data received from the external device, to the produced at least one audio signal, thereby resulting in a resulting audio signal; and
outputting or storing, by the electronic device, the resulting audio signal.

12. The method of claim 11, further comprising:
detecting, by the external device, a motion of the external device;
generating, by the external device, data associated with the gesture based on the detected motion; and
transmitting, by the external device, the data associated with the gesture to the electronic device.

13. The method of claim 12, wherein the motion of the external device comprises a finger trace, a conducting motion, and a motion simulating operation of a specified musical instrument.

14. The electronic device of claim 13, the specified musical instrument is a guitar.

* * * * *